(12) United States Patent
Mercier

(10) Patent No.: US 9,527,543 B2
(45) Date of Patent: Dec. 27, 2016

(54) LEANING VEHICLE

(71) Applicant: BOMBARDIER RECREATIONAL PRODUCTS INC., Valcourt (CA)

(72) Inventor: Daniel Mercier, Magog (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/898,432

(22) PCT Filed: Jun. 16, 2014

(86) PCT No.: PCT/US2014/042536
§ 371 (c)(1),
(2) Date: Dec. 14, 2015

(87) PCT Pub. No.: WO2014/201463
PCT Pub. Date: Dec. 18, 2014

(65) Prior Publication Data
US 2016/0137251 A1 May 19, 2016

Related U.S. Application Data

(60) Provisional application No. 61/835,062, filed on Jun. 14, 2013, provisional application No. 61/884,442, filed on Sep. 30, 2013.

(51) Int. Cl.
*B62K 5/10* (2013.01)
*B62K 5/027* (2013.01)
(Continued)

(52) U.S. Cl.
CPC ............... *B62K 5/10* (2013.01); *B62K 5/027* (2013.01); *B62K 5/05* (2013.01); *B62K 5/08* (2013.01); *B62K 2005/001* (2013.01)

(58) Field of Classification Search
CPC ............... B62K 5/10; B62K 5/08; B62K 5/05; B62K 5/027; B62K 2005/001
See application file for complete search history.

(56) References Cited

U.S. PATENT DOCUMENTS 7,485,984 B2 * 2/2009 Fulks .................. B60G 21/007
307/10.1
7,530,419 B2 * 5/2009 Brudeli ................ B60G 21/007
180/210

(Continued)

OTHER PUBLICATIONS

International Search Report of PCT/US2014/042536; received from the ISA/US; Lee W. Young; Apr. 2, 2015.

*Primary Examiner* — Drew Brown
(74) *Attorney, Agent, or Firm* — BCF LLP

(57) ABSTRACT

A leaning vehicle has a frame, a motor, a shock tower pivotally connected to the frame about a frame leaning axis, front left and right ground engaging members connected to the shock tower via front left and right suspension assemblies, a steering assembly, a rear suspension assembly, and at least one rear ground engaging member. The front left and right suspension assemblies each include a lower suspension arm having a first end pivotally connected about a pivoting axis to the lower end of the shock tower and a second end pivotally connected about a tilting axis to its corresponding front ground engaging member, and a shock absorber having an upper end connected to the upper end of the shock tower and a lower end connected to the lower suspension arm. The frame is pivotable about the frame leaning axis relative to the pivoting axes.

13 Claims, 18 Drawing Sheets

(51) Int. Cl.
  *B62K 5/05* (2013.01)
  *B62K 5/08* (2006.01)
  *B62K 5/00* (2013.01)

(56) References Cited

U.S. PATENT DOCUMENTS

| | | | |
|---|---|---|---|
| 7,568,541 B2 * | 8/2009 | Pfeil | B60G 21/007 |
| | | | 180/210 |
| 7,571,787 B2 * | 8/2009 | Saiki | B60G 7/00 |
| | | | 180/210 |
| 7,591,337 B2 * | 9/2009 | Suhre | B60G 3/20 |
| | | | 180/210 |
| 7,648,148 B1 | 1/2010 | Mercier | |
| 8,070,172 B1 * | 12/2011 | Smith | B60G 11/08 |
| | | | 280/124.103 |
| 8,336,660 B2 * | 12/2012 | Ogura | B62M 27/02 |
| | | | 180/182 |
| 8,342,548 B1 | 1/2013 | Vey et al. | |
| 8,814,186 B1 * | 8/2014 | Rinda | B62K 5/06 |
| | | | 280/124.135 |
| 9,061,732 B1 * | 6/2015 | Vezina | B62M 27/02 |
| 9,238,482 B2 * | 1/2016 | Huang | B62D 9/04 |
| 9,327,789 B1 * | 5/2016 | Vezina | B62K 5/10 |
| 2007/0029751 A1 * | 2/2007 | Marcacci | B62D 9/02 |
| | | | 280/124.1 |
| 2007/0262549 A1 * | 11/2007 | Haerr | B60G 21/007 |
| | | | 280/124.103 |
| 2008/0197597 A1 * | 8/2008 | Moulene | B60G 21/007 |
| | | | 280/124.103 |
| 2008/0238005 A1 * | 10/2008 | James | B62D 9/02 |
| | | | 280/5.509 |
| 2008/0258415 A1 * | 10/2008 | Melcher | B60G 7/006 |
| | | | 280/124.103 |
| 2012/0232758 A1 | 9/2012 | Mercier | |
| 2013/0113174 A1 | 5/2013 | Mercier | |

* cited by examiner

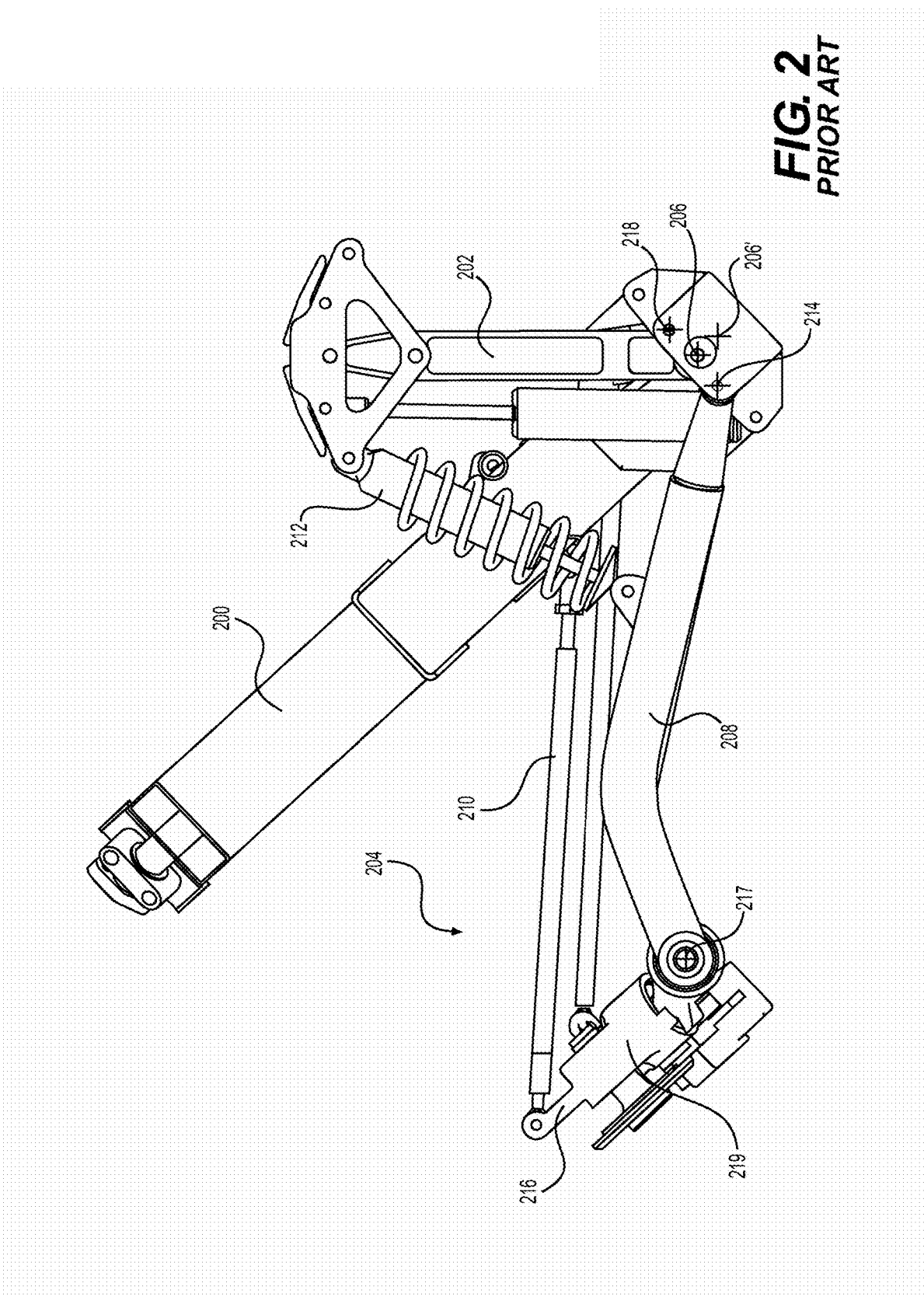

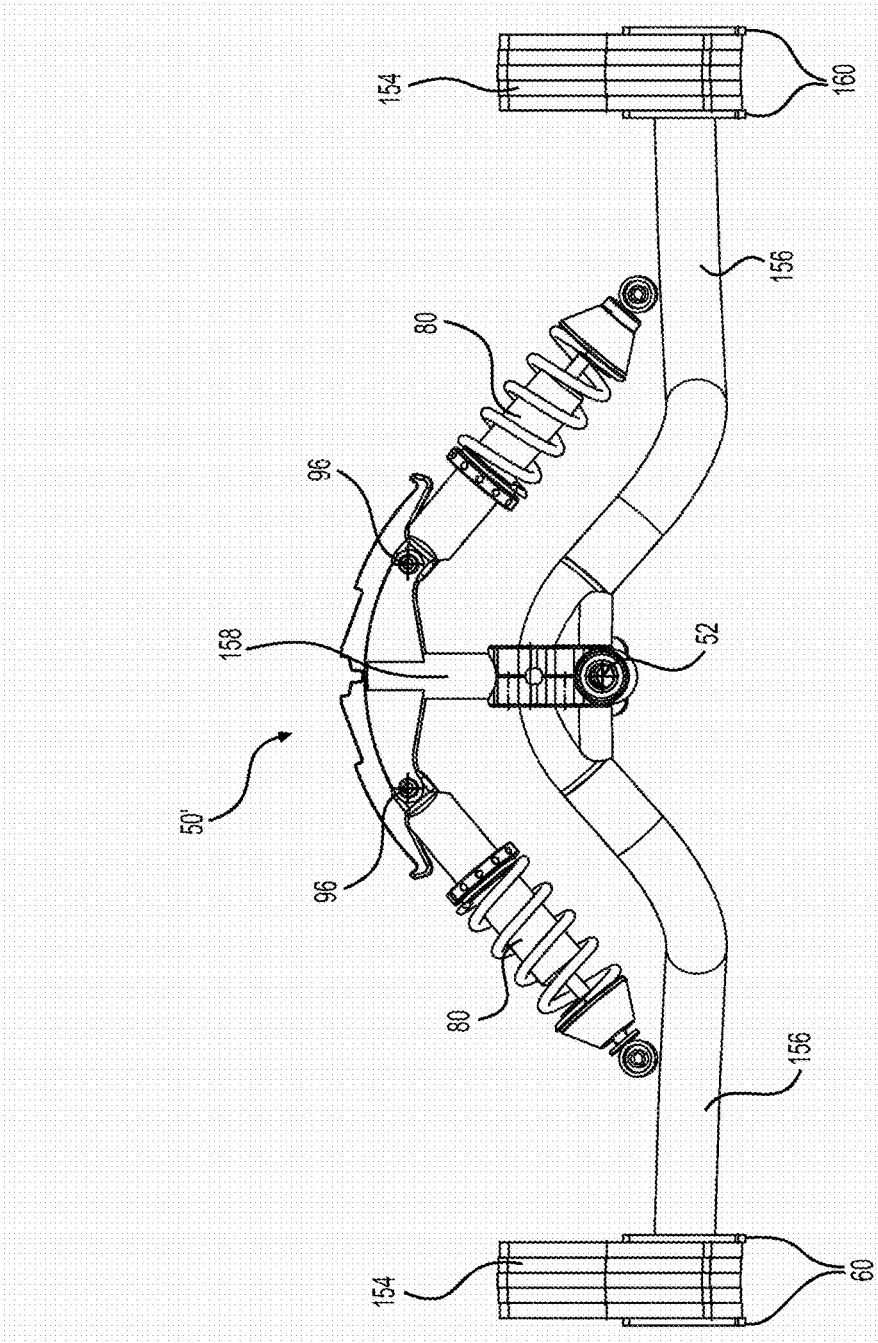

LEANING VEHICLE

CROSS-REFERENCE

The present application claims priority to U.S. Provisional Patent Application No. 61/835,062, filed Jun. 14, 2013, and to U.S. Provisional Patent Application No. 61/884,442, filed Sep. 30, 2013, the entirety of both of which is incorporated herein by reference.

FIELD OF TECHNOLOGY

The present technology relates to leaning vehicles.

BACKGROUND

Leaning vehicles having more than one front or rear wheels require a frame that is pivotally connected to the two-wheel suspension assemblies to permit the vehicle to lean. One such vehicle is disclosed in PCT Publication No. WO 2011/059456 A1 (the '456 publication), published on May 19, 2011. The vehicle in the '456 publication has a two front wheels and a single rear wheel.

FIGS. 1 and 2 illustrate a frame 200, shock tower 202 and a front right suspension assembly 204 of a vehicle of the type described in the '456 publication. The front left suspension assembly of this vehicle is a mirror image of the front right suspension assembly 204 and as such will not be described in detail herein.

As can be seen in FIG. 1, the frame 200 is pivotally connected to the shock tower 202 about a frame leaning axis 206. The front right suspension assembly 204 has a lower suspensions arm 208, a leaning rod 210 and a shock absorber 212. The lower suspension arm 208 is pivotally connected at one end to the frame 200 about a pivoting axis 214 and is pivotally connected at the other end to a kingpin 216 about a tilting axis 217. The kingpin 216 has a knuckle 219 pivotally disposed thereon. The knuckle 219 supports the front right wheel thereon. The inner end of the lower suspension arm of the front left suspension assembly is similarly connected to the frame 200 about a pivoting axis 218. As can be seen in FIG. 1, when the frame 200 is in the upright position, the pivoting axes 214, 218 are disposed to the right and left of the frame leaning axis 206 respectively and are located vertically higher than the frame leaning axis 206. The leaning rod 210 is pivotally connected to the frame 200 at one end and to the kingpin 216 at the other end. The shock absorber 212 is connected to the lower suspension arm 208 at its lower end and to the shock tower 202 at its upper end.

When the vehicle turns, the frame 200 and, as a result, the wheels lean toward the inside of the turn. When making a right turn as shown in FIG. 2, the frame 200 pivots toward the right about the frame leaning axis 206 and the wheels also pivot toward the right as would be understood from the pivoting of the kingpin 216 about the tilting axis 217.

Additional details regarding a vehicle of this type and the manner in which it leans can be found in the '456 publication.

When turning, the frame 200 and other components of the vehicle need to be sufficiently leaning such that the lateral forces between the tires and the ground are sufficient to prevent the vehicle from falling over.

As can be seen by comparing FIG. 1 to FIG. 2A, due to the manner in which the lower suspension arms 208 are connected to the frame 200, when the frame 200 leans, the pivoting axes 214, 218 are displaced from the positions they occupy when in the upright position of the frame 200. This displacement of the pivoting axes 214, 218 also causes a displacement of the frame leaning axis 206 and thus causes the center of gravity (CG) to travel along trajectory 1 (FIG. 2A) which resembles an arc rather than a constant radius as in trajectory 2 (FIG. 2A).

FIG. 2A shows two different trajectories of a CG during a turn and the displacement of the center of pressure (CP) of the tires, or its equivalent in the case of a three-wheel vehicle, on the ground. Trajectory 1 represents the movement of a CG of a vehicle and of a corresponding center of pressure CP 1 with the suspension of FIGS. 1 and 2 and trajectory 2 represents the movement of a CG and a corresponding center of pressure CP2 of a motorcycle having two in-line wheels.

As can be seen in FIG. 2, when the frame 200 leans to the right, the frame leaning axis 206, and the rest of the leaning components, are displaced upward and to the right from the positions they occupy when the frame 200 is upright (illustrated by axis 206' in FIG. 2 for the leaning axis 206), similar to that of trajectory 1 of FIG. 2a. As can also be seen in FIG. 2A, the CP of a vehicle with the suspension geometry of FIG. 1 moves laterally and thus the effective lean angle (the angle between a line passing through the CG and the CP with respect to vertical) has been reduced. As can be seen in FIG. 2A, the effective lean angle A is less than the effective lean angle B. The lateral g-forces generated is a ratio of the horizontal and vertical distances between the CP and the vehicle's CG. Therefore, trajectory 1 generates less lateral g-forces than trajectory 2 even though both vehicle frames are equally leaned with respect to vertical. As such, for two vehicles, one with the geometry of FIG. 1 and the other with inline wheels, to travel through the same trajectory with the same travel characteristics, the vehicle with the geometry of FIG. 1 (trajectory 1) would have to lean further with respect to vertical.

Thus, there is a need for a leaning vehicle having at least three wheels that requires less leaning to produce a desired lateral g-force.

Furthermore, it may be desirable under certain conditions to prevent the frame of a leaning vehicle from leaning. Examples of such conditions include when the vehicle is parked or operating at low speeds.

Thus, there is a need for a leaning vehicle in which the frame can be prevented from leaning.

In a vehicle that does not lean, the shock absorbers are connected to the frame. As such, the unsprung mass (i.e. the wheels, brakes and other elements connected to the frame via the suspension system) is much smaller than the sprung mass (i.e. the frame and other elements supported by the suspension system). As such, when a wheel encounters a bump for example, the sprung mass is sufficiently large to cause the shock absorber to compress.

However, for a leaning vehicle of the type disclosed in the '456 publication, the shock absorbers are connected to the shock tower as described above. As would be understood, the mass of the shock tower is much smaller than the sprung mass of the non-leaning vehicle described above (all things being equal except for the leaning aspect of the vehicle) thus the system has very low damping characteristics again the rotation of the shock tower. When the wheels go over large bumps or depressions (i.e. high amplitude movement), the shock absorbers react essentially as they would in a non-leaning vehicle where the shock absorbers are connected to the frame. When the wheels go over small bumps or depressions (i.e. low amplitude movement/higher frequency) some issues can arise however. The forces generated by such low amplitude movement of the wheels can be too small for the tires to absorb and for the stiffness of the shock absorber to be overcome (i.e. the shock absorber does not compress). The mass of the shock tower can also be too small to resist the force being transferred through the shock absorber. As a result, the shock tower, the two shock absorbers, the suspension arms and the wheels essentially react as if they were a single rigid element. When the left wheel goes over a small bump for example, the force is transferred from the left wheel to the left shock absorber, then to the shock tower, and since the left shock absorber does not compress, the force is then transferred from the shock tower to the right shock absorber and to the right wheel. Since the right shock absorber also does not compress, the tire of the right wheel compresses, then springs back thereby transferring the force back through the shock tower to the left shock absorber and the left wheel, and the process is repeated. This oscillation of the force can eventually lead to the wheels oscillating up and down, which, when the vehicle is manoeuvring through a turn, is sometimes referred to as "wheel hop" since this oscillation can cause the tires to momentarily loose contact with the ground and be pushed toward the outside of the turn. As would be understood, "wheel hop" is not desirable.

Thus, there is a need for a leaning vehicle in which the shock absorbers are attached to the shock tower that addresses the "wheel hop" phenomenon.

SUMMARY

It is an object of the present technology to ameliorate at least some of the deficiencies of the prior art.

According to one aspect of the present technology, there is provided a leaning vehicle having a frame having a front portion and a rear portion, a shock tower having an upper end and a lower end, the lower end of the shock tower being pivotally connected to the frame about a frame leaning axis about which the frame can pivot to a right side and to a left side relative to the shock tower, a front left ground engaging member and a front right ground engaging member connected to the shock tower via a front left suspension assembly and a front right suspension assembly respectively, a steering assembly having a rotatable steering column supported by the frame and being operatively connected to the front left ground engaging member and the front right ground engaging member, a rear suspension assembly connected to the rear portion of the frame, and at least one rear ground engaging member connected to the rear suspension assembly. A motor is operatively connected to at least one of the ground engaging members. The front left suspension assembly includes a lower left suspension arm having a first end and a second end, the first end being pivotally connected about a left pivoting axis to the lower end of the shock tower and the second end being pivotally connected about a left tilting axis to the front left ground engaging member, and a left shock absorber having an upper end connected to the upper end of the shock tower and a lower end connected to the lower left suspension arm. The front right suspension assembly includes a lower right suspension arm having a first end and a second end, the first end being pivotally connected about a right pivoting axis to the lower end of the shock tower and the second end being pivotally connected about a right tilting axis to the front right ground engaging member, and a right shock absorber having an upper end connected to the upper end of the shock tower and a lower end connected to the lower right suspension arm. The frame is pivotable about the frame leaning axis relative to the left and right pivoting axes.

In some implementations of the present technology, the front left ground engaging member is a front left wheel, the front right ground engaging member is a front right wheel, and the at least one rear ground engaging member is at least one rear wheel.

In some implementations of the present technology, the at least one rear wheel is a single rear wheel.

In some implementations of the present technology, the left pivoting axis is a lower left pivoting axis, the left tilting axis is a lower left tilting axis, the right pivoting axis is a lower right pivoting axis, and the right tilting axis is a lower right tilting axis. The front left suspension assembly further includes an upper left suspension arm having a first end and a second end, the first end being pivotally connected about an upper left pivoting axis to the frame and the second end being pivotally connected about an upper left tilting axis to the front left ground engaging member. The front right suspension assembly further includes an upper right suspension arm having a first end and a second end, the first end being pivotally connected about an upper right pivoting axis to the frame and the second end being pivotally connected about an upper right tilting axis to the front right ground engaging member. The upper left and right pivoting axes are pivotable about the frame leaning axis with the frame.

In some implementations of the present technology, a lock selectively prevents relative movement between the frame and the shock tower about the frame leaning axis.

In some implementations of the present technology, the left pivoting axis is disposed to a left of the frame leaning axis, and the right pivoting axis is disposed to a right of the frame leaning axis.

In some implementations of the present technology, the left and right pivoting axes are disposed closer to the upper end of the shock tower than the frame leaning axis.

In some implementations of the present technology, the first end of the lower left suspension arm and the first end of the lower right suspension arm are each pivotally connected to the shock tower by a pin. At least one bushing is disposed between each pin and the first end of its corresponding lower suspension arm.

In some implementations of the present technology, the left and right pivoting axes are parallel to each other.

In some implementations of the present technology, the left and right pivoting axes are parallel to the frame leaning axis.

In some implementations of the present technology, a line passing through the left and right pivoting axes remains horizontal regardless of a position of the frame relative to the shock tower.

In some implementations of the present technology, an axis of rotation of the rear wheel defines a first plane. The first plane is parallel to a second plane containing the left and right pivoting axes when the frame is in an upright position. The first plane intersects the second plane when the frame is pivoted to one of the right side and the left side relative to the shock tower.

In some implementations of the present technology, a first plane containing the frame leaning axis and passing through a center of the steering column is disposed at an acute angle to a second plane containing the left and right pivoting axes when the frame is pivoted to one of the right side and the left side relative to the shock tower.

According to another aspect of the present technology, there is provided a leaning vehicle having a frame having a front portion, and a rear portion, a shock tower having an upper end and a lower end, the lower end of the shock tower being pivotally connected to the frame about a frame leaning axis about which the frame can pivot to a right side and to a left side relative to the shock tower, a front left ground engaging member and a front right ground engaging member connected to at least one of the shock tower and the frame via a front left suspension assembly and a front right suspension assembly respectively, a steering assembly having a rotatable steering column supported by the frame and being operatively connected to the front left ground engaging member and the front right ground engaging member, a rear suspension assembly connected to the rear portion of the frame, at least one rear ground engaging member connected to the rear suspension assembly, a motor operatively connected to at least one of the ground engaging members, and a lock movable between a locked position and an unlocked position. In the locked position, the lock prevents relative movement between the frame and the shock tower about the frame leaning axis. In the unlocked position, the lock permits relative movement between the frame and the shock tower about the frame leaning axis. The lock includes an overcenter mechanism. An actuator is connected between the frame and the lock to move the lock between the locked and unlocked positions.

In some implementations of the present technology, the shock tower has a lock engagement surface and the lock has a shock tower engagement surface. In the locked position the shock tower engagement surface contacts the lock engagement surface. In the unlocked position the shock tower engagement surface is spaced from the lock engagement surface.

In some implementations of the present technology, the lock engagement surface faces downward and the shock tower engagement surface faces upward. The shock tower engagement surface is vertically higher in the locked position than in the unlocked position.

In some implementations of the present technology, the lock engagement surface and the shock tower engagement surface are curved surfaces.

In some implementations of the present technology, a center of curvature of the lock engagement surface is the frame leaning axis.

In some implementations of the present technology, the lock engagement surface has a plurality of teeth and the shock tower engagement surface has at least one tooth. In the locked position, the at least on tooth of the shock tower engagement surface engages at least some of the plurality of teeth of the lock engagement surface.

In some implementations of the present technology, the overcenter mechanism has a first link pivotally connected to the frame about a first axis, a second link pivotally connected to the first link about a second axis, and a third link pivotally connected to the second link about a third axis and pivotally connected to the frame about a fourth axis. In the locked position the second axis is disposed on a first side of a line passing through the first and third axes. In the unlocked position, the second axis is disposed on a second side of the line opposite the first side.

In some implementations of the present technology, the first, second, third and fourth axes extend laterally. In the locked position, the second axis is disposed in front of the line. In the unlocked position, the second axis is disposed behind the line.

In some implementations of the present technology, the actuator is pivotally connected to one of the first and second links.

In some implementations of the present technology, the actuator is pivotally connected to the first link.

In sonic implementations of the present technology, the overcenter mechanism further comprises a spring connected to one of the first and second links. In the locked position, the spring is compressed and biases the lock toward the locked position. In the unlocked position, the spring is compressed and biases the lock toward the unlocked position.

In some implementations of the present technology, the spring is connected to the first link.

In some implementations of the present technology, the actuator is pivotally connected to the one of the first and second links to which the spring is connected.

In some implementations of the present technology, the actuator is pivotally connected to the first link and the spring is connected to the first link.

In some implementations of the present technology, the actuator includes an electric motor.

In some implementations of the present technology, the front left ground engaging member is a front left wheel, the front right ground engaging member is a front right wheel, and the at least one rear ground engaging member is at least one rear wheel.

In some implementations of the present technology, he at least one rear wheel is a single rear wheel.

According to another aspect of the present technology, there is provided a leaning vehicle having a frame having a front portion, and a rear portion, a shock tower having an upper end and a lower end, the lower end of the shock tower being pivotally connected to the frame about a frame leaning axis about which the frame can pivot to a right side and to a left side relative to the shock tower, a front left ground engaging member and a front right ground engaging member connected to at least one of the shock tower and the frame via a front left suspension assembly and a front right suspension assembly respectively, portions of the front left suspension assembly, the front left ground engaging member and other components of the vehicle suspended from the at least one of the shock tower and the frame by the front left suspension assembly have a first unsprung mass, portions of the front right suspension assembly, the front right ground engaging member and other components of the vehicle suspended from the at least one of the shock tower and the frame by the front right suspension assembly have a second unsprung mass, a moment of inertia of the shock tower being at least twenty-five percent of a combined moment of inertia of the first and second unsprung masses, a steering assembly having a rotatable steering column supported by the frame and being operatively connected to the front left ground engaging member and the front right ground engaging member, a rear suspension assembly connected to the rear portion of the frame, at least one rear ground engaging member connected to the rear suspension assembly, and a motor operatively connected to at least one of the ground engaging members.

In some implementations of the present technology, the front left ground engaging member is a front left wheel, the front right ground engaging member is a front right wheel, and the at least one rear ground engaging member is at least one rear wheel.

In some implementations of the present technology, the at least one rear wheel is a single rear wheel.

In some implementations of the present technology, a center of gravity of the shock tower is located vertically between a top of the shock tower and a point that is halfway between the top of the shock tower and the frame leaning axis.

In some implementations of the present technology, the front left suspension assembly includes a lower left suspension arm having a first end and a second end, the first end being pivotally connected about a left pivoting axis to one of the frame and the lower end of the shock tower and the second end being pivotally connected about a left tilting axis to the front left ground engaging member, and a left shock absorber having an upper end pivotally connected about an upper left shock absorber axis to the upper end of the shock tower and a lower end pivotally connected about a lower left shock absorber axis to the lower left suspension arm. The front right suspension assembly includes a lower right suspension arm having a first end and a second end, the first end being pivotally connected about a right pivoting axis to one of the frame and the lower end of the shock tower and the second end being pivotally connected about a right tilting axis to the front right ground engaging member, and a right shock absorber having an upper end pivotally connected about an upper right shock absorber axis to the upper end of the shock tower and a lower end pivotally connected about a lower right shock absorber axis to the lower right suspension arm. The center of gravity of the shock tower is disposed between the top of the shock tower and a plane containing the upper left and upper right shock absorber axes.

In some implementations of the present technology, a first line parallel to the frame leaning axis and containing the center of gravity of the shock tower passes through an intersection point of a second line and a third line. The second line passes through the upper left shock absorber axis and the lower left shock absorber axis. The third line passes through the upper right shock absorber axis and the lower right shock absorber axis. The second and third lines are in a common plane.

In some implementations of the present technology, the center of gravity of the shock tower is disposed at a distance above the frame leaning axis. The distance corresponds to at least a quarter of a front track width.

According to another aspect of the present technology, there is provided a leaning vehicle having a frame having a front portion, and a rear portion, a shock tower having an upper end and a lower end, the lower end of the shock tower being pivotally connected to the frame about a frame leaning axis about which the frame can pivot to a right side and to a left side relative to the shock tower, a center of gravity of the shock tower being located vertically between a top of the shock tower and a point that is between the top of the shock tower and the frame leaning axis, a distance between the point and the frame leaning axis being at least a quarter of a track width, a front left ground engaging member and a front right ground engaging member connected to at least one of the shock tower and the frame via a front left suspension assembly and a front right suspension assembly respectively, a steering assembly having a rotatable steering column supported by the frame and being operatively connected to the front left ground engaging member and the front right ground engaging member, a rear suspension assembly connected to the rear portion of the frame, at least one rear ground engaging member connected to the rear suspension assembly, and a motor operatively connected to at least one of the ground engaging members.

In some implementations of the present technology, the front left ground engaging member is a front left wheel, the front right ground engaging member is a front right wheel, and the at least one rear ground engaging member is at least one rear wheel.

In some implementations of the present technology, the at least one rear wheel is a single rear wheel.

In some implementations of the present technology, the front left suspension assembly includes a lower left suspension arm having a first end and a second end, the first end being pivotally connected about a left pivoting axis to one of the frame and the lower end of the shock tower and the second end being pivotally connected about a left tilting axis to the front left ground engaging member, and a left shock absorber having an upper end pivotally connected about an upper left shock absorber axis to the upper end of the shock tower and a lower end pivotally connected about a lower left shock absorber axis to the lower left suspension arm. The front right suspension assembly includes a lower right suspension arm having a first end and a second end, the first end being pivotally connected about a right pivoting axis to one of the frame and the lower end of the shock tower and the second end being pivotally connected about a right tilting axis to the front right ground engaging member, and a right shock absorber having an upper end pivotally connected about an upper right shock absorber axis to the upper end of the shock tower and a lower end pivotally connected about a lower right shock absorber axis to the lower right suspension arm. The center of gravity of the shock tower is disposed between the top of the shock tower and a plane containing the upper left and upper right shock absorber axes.

In some implementations of the present technology, a first line parallel to the frame leaning axis and containing the center of gravity of the shock tower passes through an intersection point of a second line and a third line. The second line passes through the upper left shock absorber axis and the lower left shock absorber axis. The third line passes through the upper right shock absorber axis and the lower right shock absorber axis. The second and third lines are in a common plane.

For the purpose of this application, terms related to spatial orientation such as downward, rearward, forward, front, rear, left, right, above and below are as they would normally be understood by a driver of the vehicle sitting thereon in a normal driving position.

Implementations of the present vehicle each have at least one of the above-mentioned object and/or aspects, but do not necessarily have all of them. It should be understood that some aspects of the present vehicle that have resulted from attempting to attain the above-mentioned object may not satisfy this object and/or may satisfy other objects not specifically recited herein.

Additional and/or alternative objects, features, aspects and advantages of implementations of the present vehicle will become apparent from the following description, the accompanying drawings and the appended claims.

BRIEF DESCRIPTION OF THE DRAWINGS

For a better understanding of the present technology as well as other aspects and further features thereof, reference is made to the following description which is to be used in conjunction with the accompanying drawings, where:

FIG. 2 is a front elevation view of the front right suspension assembly, the shock tower and the portion of the frame of FIG. 1, with the frame pivoted toward the right;

FIG. 17 is a front elevation view of an alternative implementation of a shock tower.

DETAILED DESCRIPTION

A three-wheel leaning vehicle 10 is described herein. It is contemplated that aspects of the three wheel leaning vehicle 10 could be used on a vehicle having ground engaging members other than wheels, such as for example a snowmobile on which the ground engaging member are two skis and a drive track. It is also contemplated that aspects of the three-wheel vehicle 10 could be used on a vehicle having more than three ground engaging members such as a four-wheel leaning vehicle.

Figure 1:
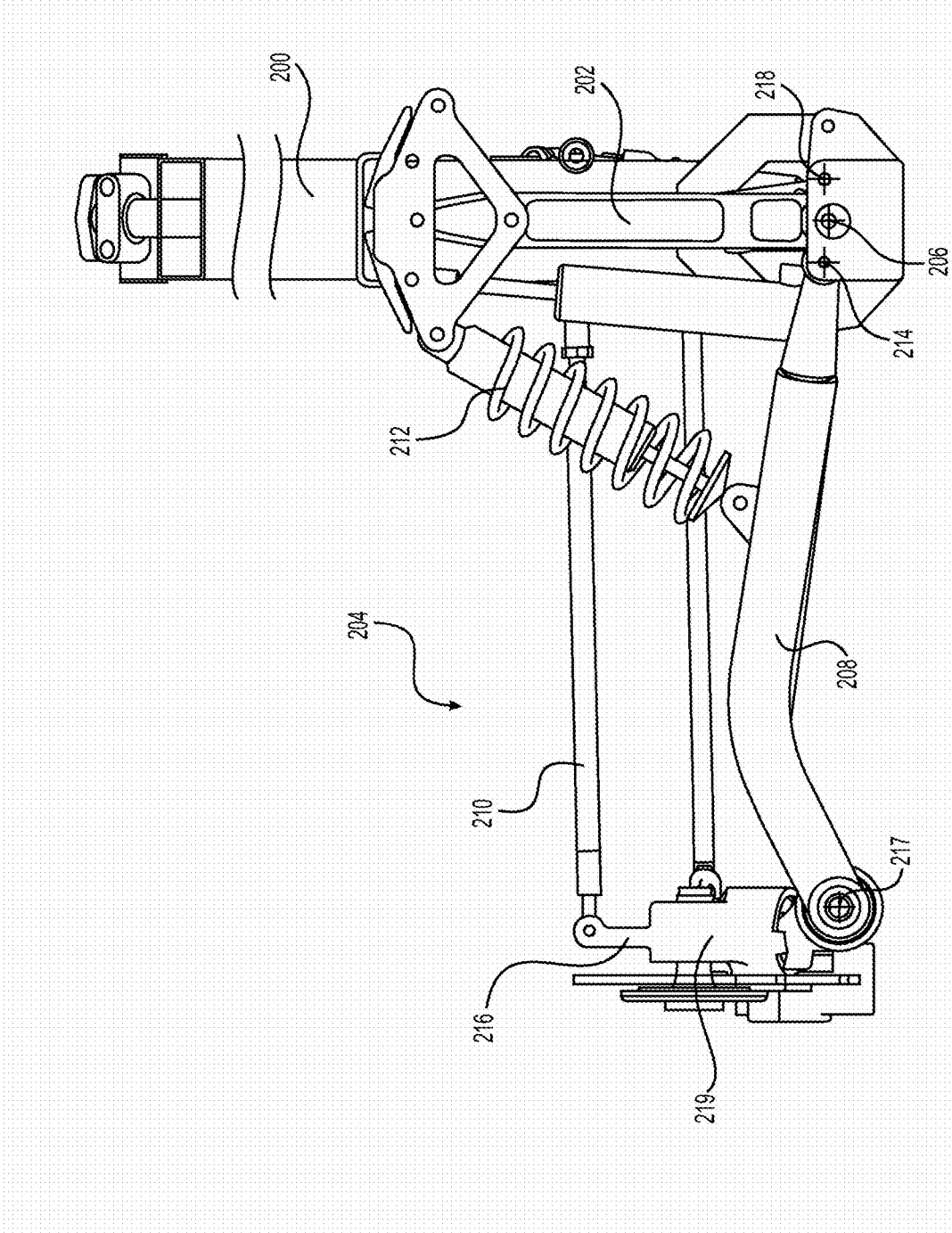
FIG. 1 is a front elevation view of a front right suspension assembly, a shock tower and a portion of a frame of a prior art leaning vehicle, with the frame in an upright position.
Figure 2A:
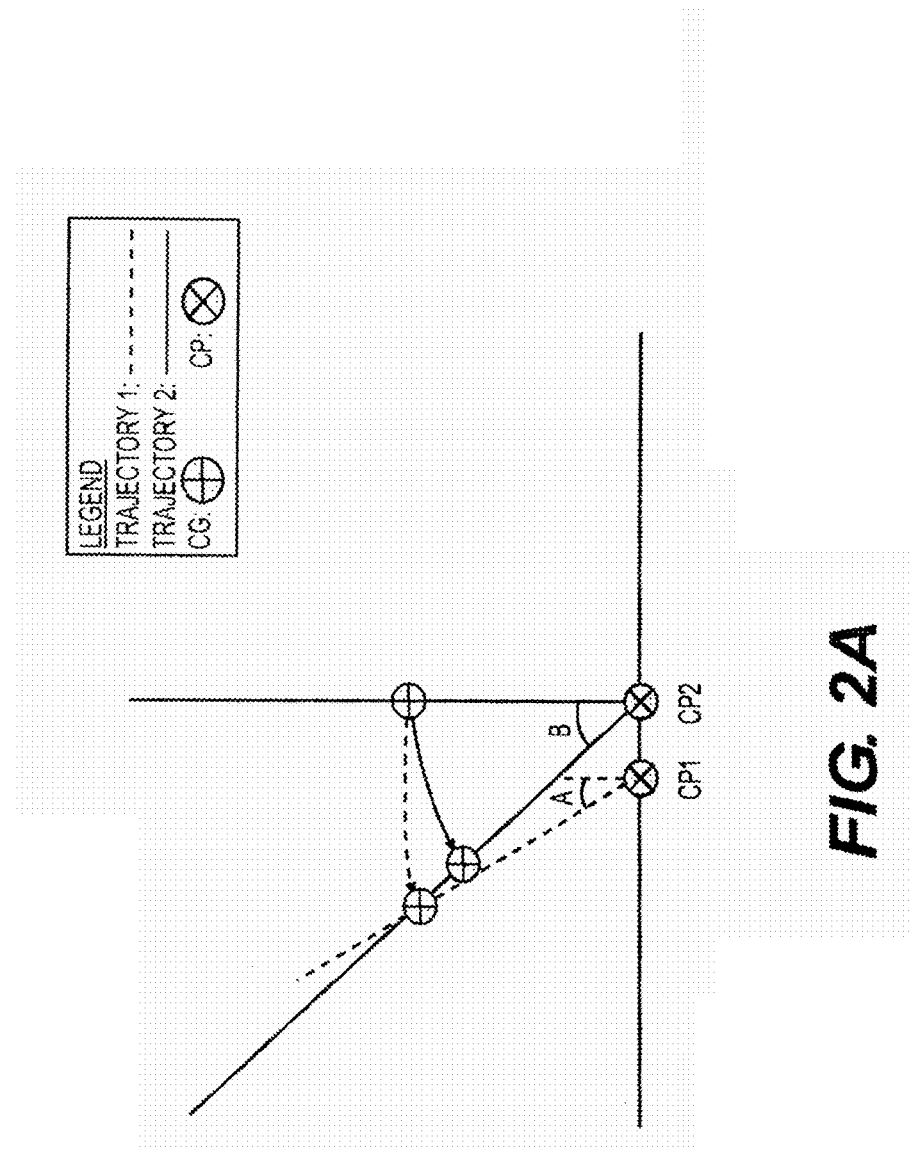
FIG. 2A is a diagram showing a trajectory of a center of gravity during a right turn for different types of vehicle.
Figure 3:
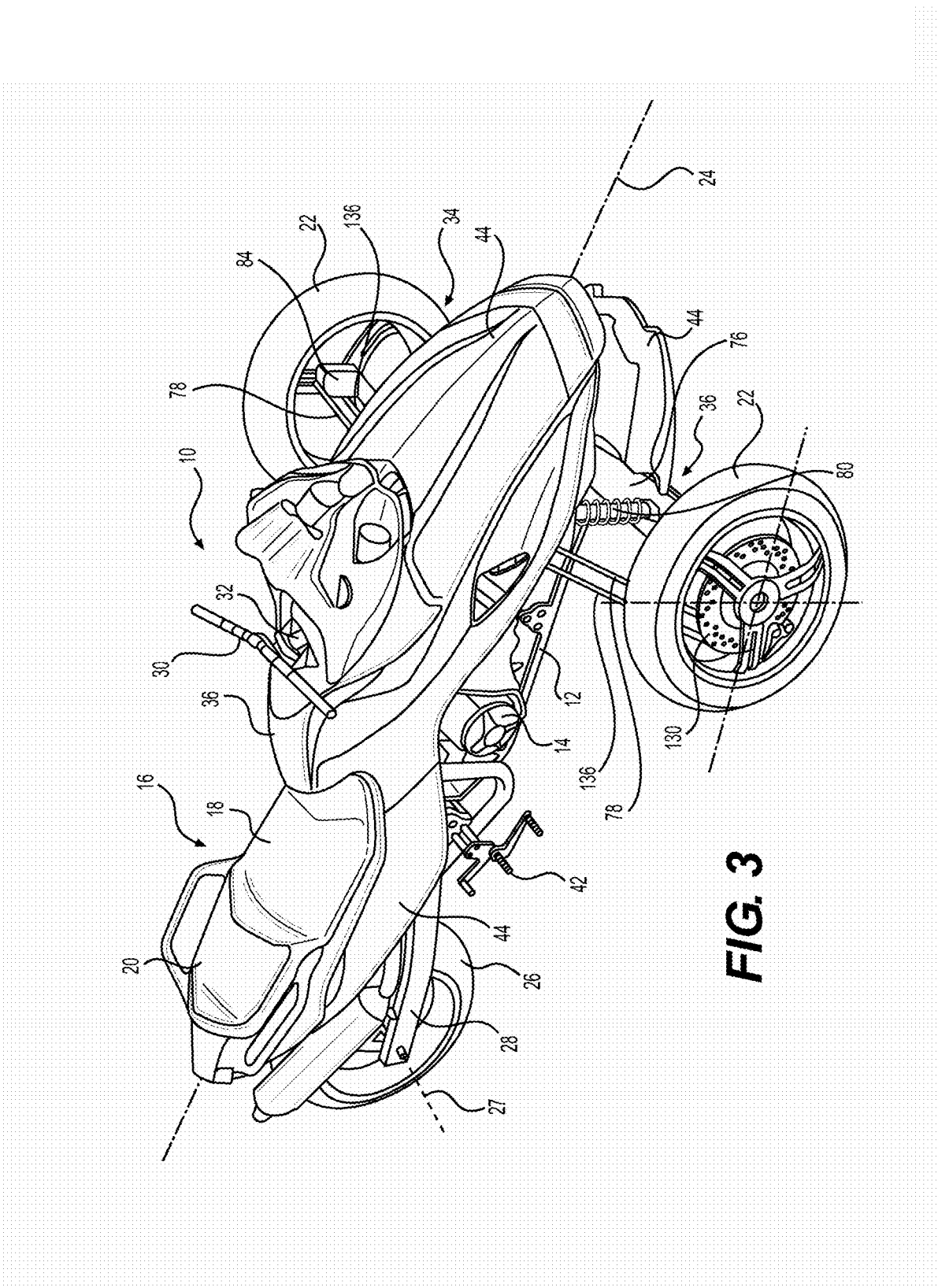
FIG. 3 is a perspective view taken from a front, left side of a three-wheel leaning vehicle.
Figure 7:
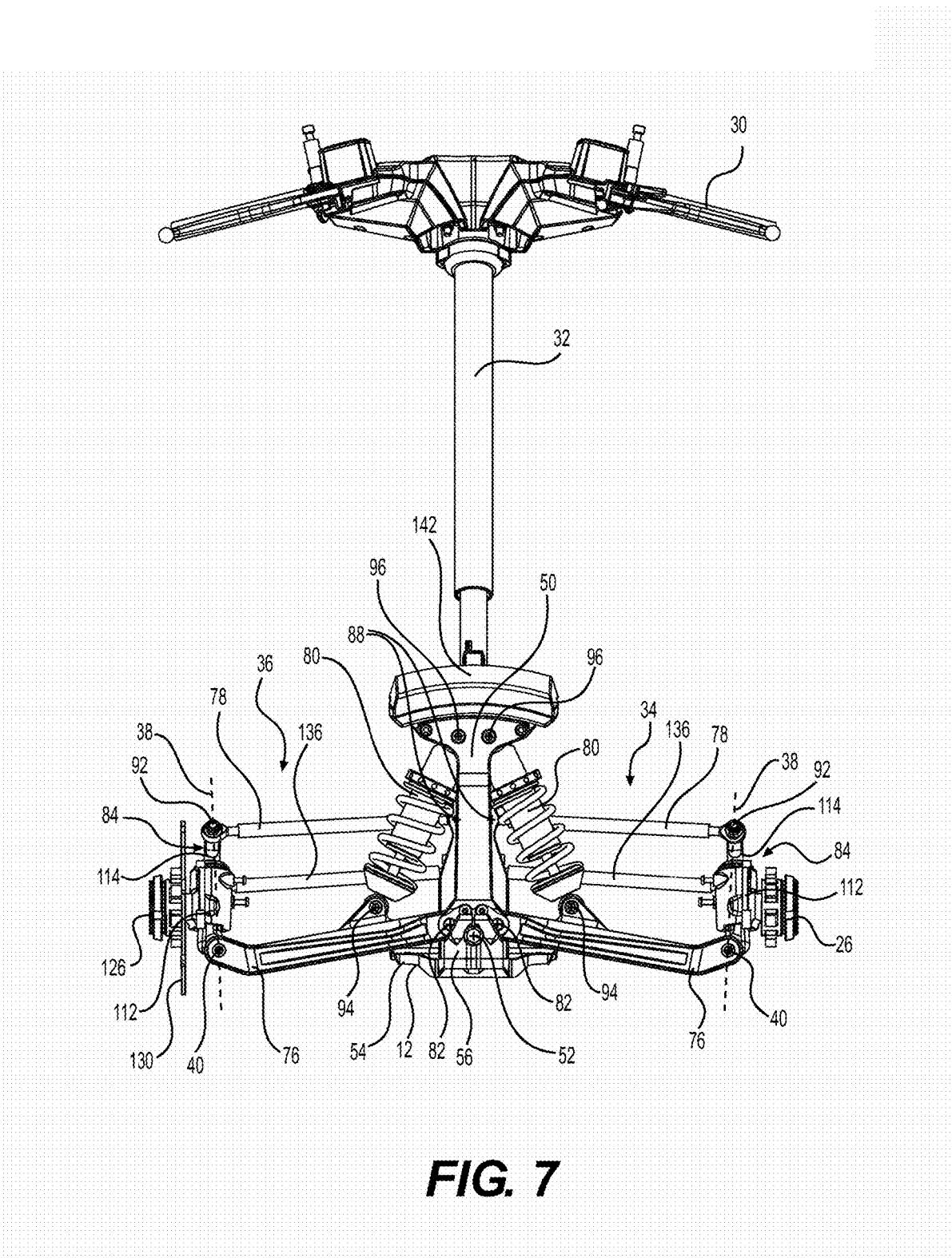
FIG. 7 is a front elevation view of the components of FIG. 4 with the front wheels removed.
Figure 8:
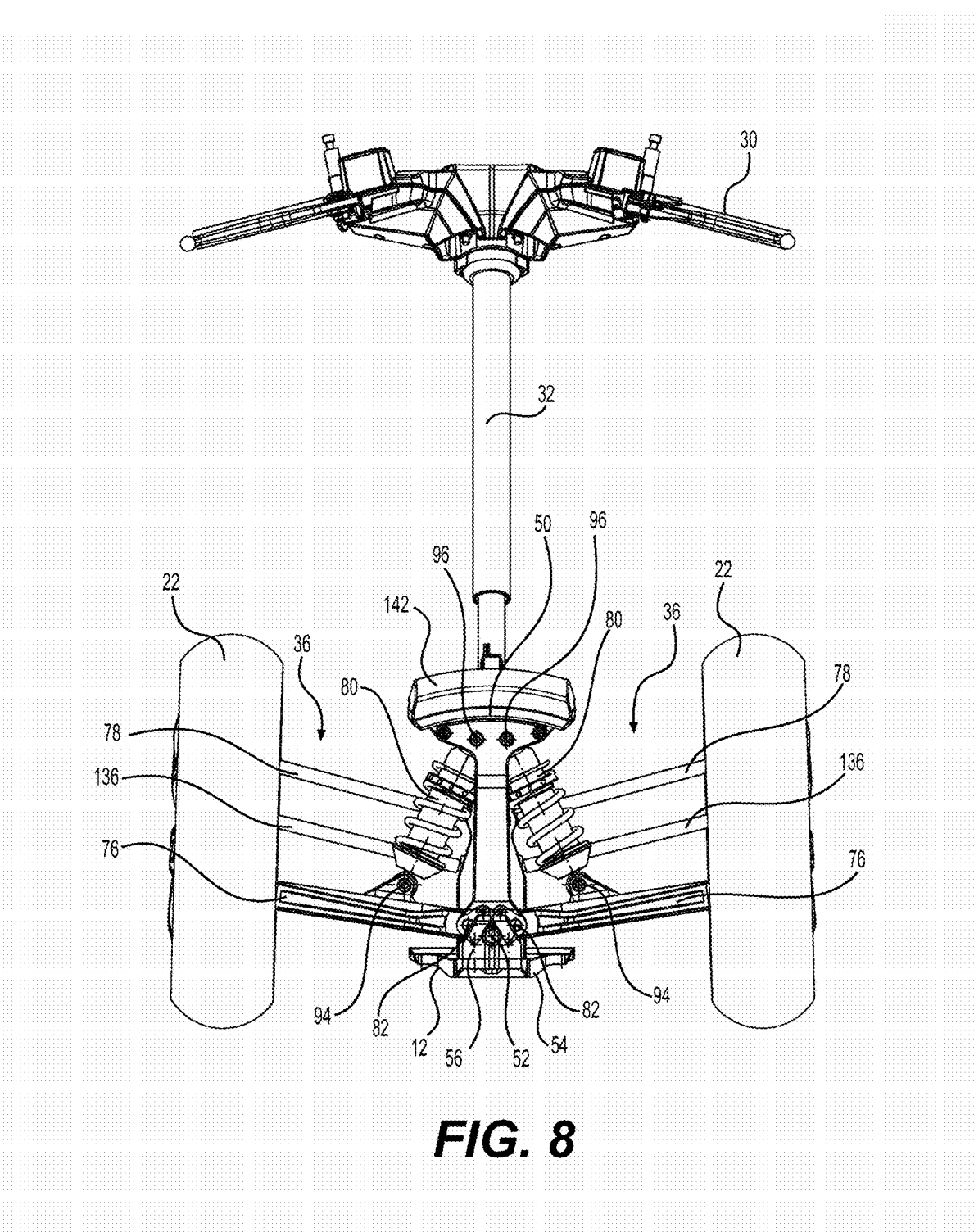
FIG. 8 is a front elevation view of the components of FIG. 4 with the front suspension assemblies in compression.
Figure 9:
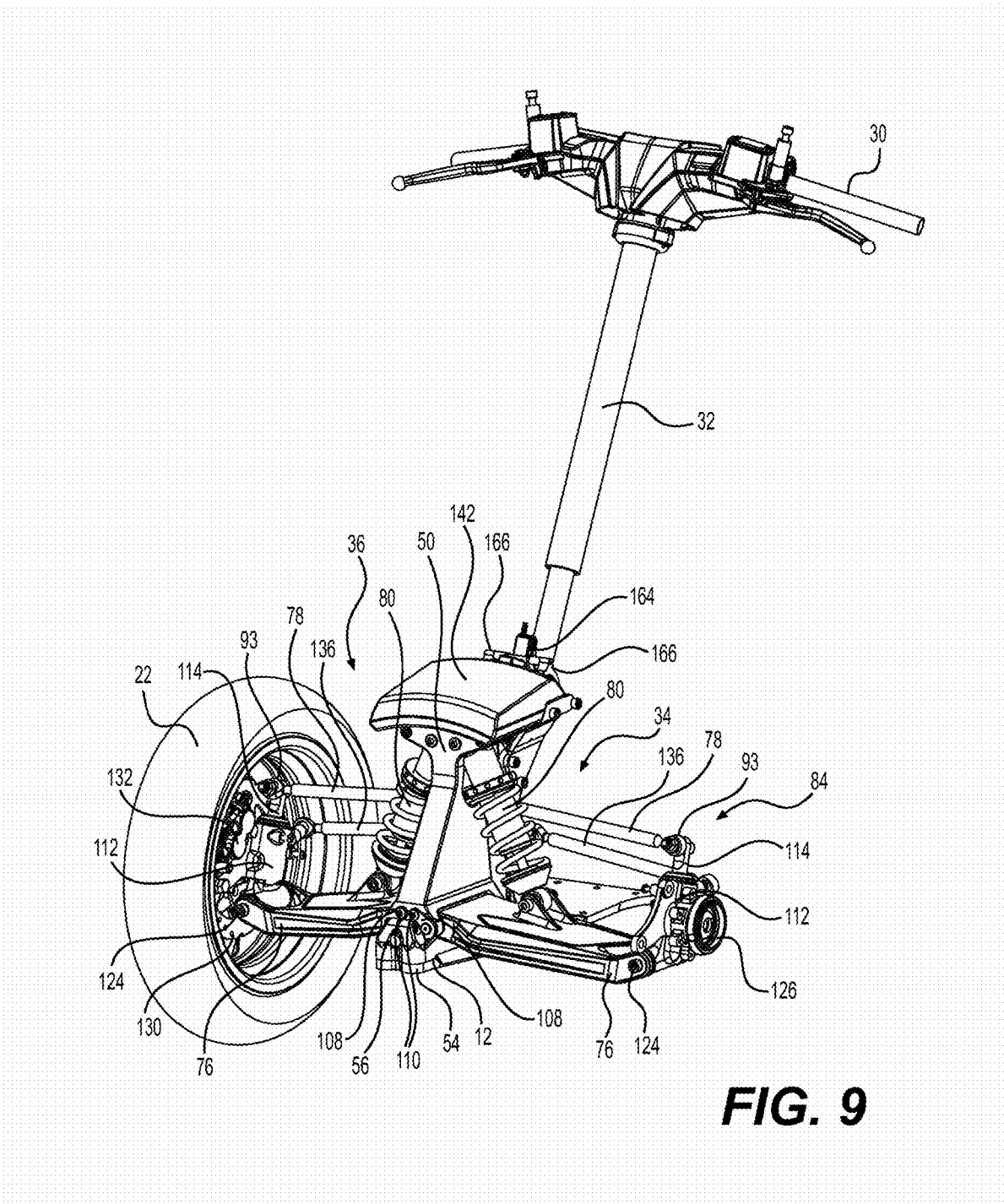
FIG. 9 is a perspective view taken from a front, left side of the components of FIG. 4 with the front left wheel removed.

As can be seen in FIG. 3, the vehicle 10 includes a frame 12 that supports a motor 14. In the present implementation, the motor 14 is a four-stroke internal combustion engine. It is contemplated that the motor 14 could be any type of power source such as an electric motor or a two-stroke internal combustion engine. A straddle-type seat 16 is mounted on the frame 14. The seat 16 has a driver seat portion 18 and a passenger seat portion 20 disposed behind the driver seat portion 18. The leaning vehicle 10 has a front right wheel 22 and a front left wheel 22 disposed on either side of a longitudinal axis 24, and a single central rear wheel 26. Each of the wheels 22, 26 has a tire thereon. The rear wheel 26 rotates about an axis of rotation 27. The rear wheel 26 is suspended by a rear suspension assembly 28 attached to the rear portion of the frame 12. The rear wheel 26 is operatively connected to the motor 14 via a drive belt assembly. A steering assembly includes a handlebar 30 and a steering column 32 disposed in front of the seat 16. The steering column 22 is connected to the front wheels 22 to steer the vehicle 10 as will be described in greater detail below. Front left and right suspension assemblies 34, 36 attach the front wheels 22 to the vehicle 10 as will be described in greater detail below. The suspension assemblies 34, 36 permit the turning of the wheels 22 about steering axes 38 and tilting of the wheels 22 about lower wheel tilting axes 40 (see FIG. 7). Foot pegs 42 (only the right side foot peg 42 being shown) project from the frame 12 below the seat 16 so that the driver may rest his/her feet thereupon while driving. The leaning vehicle 10 includes a plurality of fairings 44 which serve to protect the vehicle components from the elements during use and render the vehicle 10 aerodynamically efficient and aesthetically pleasing.

Figure 4:
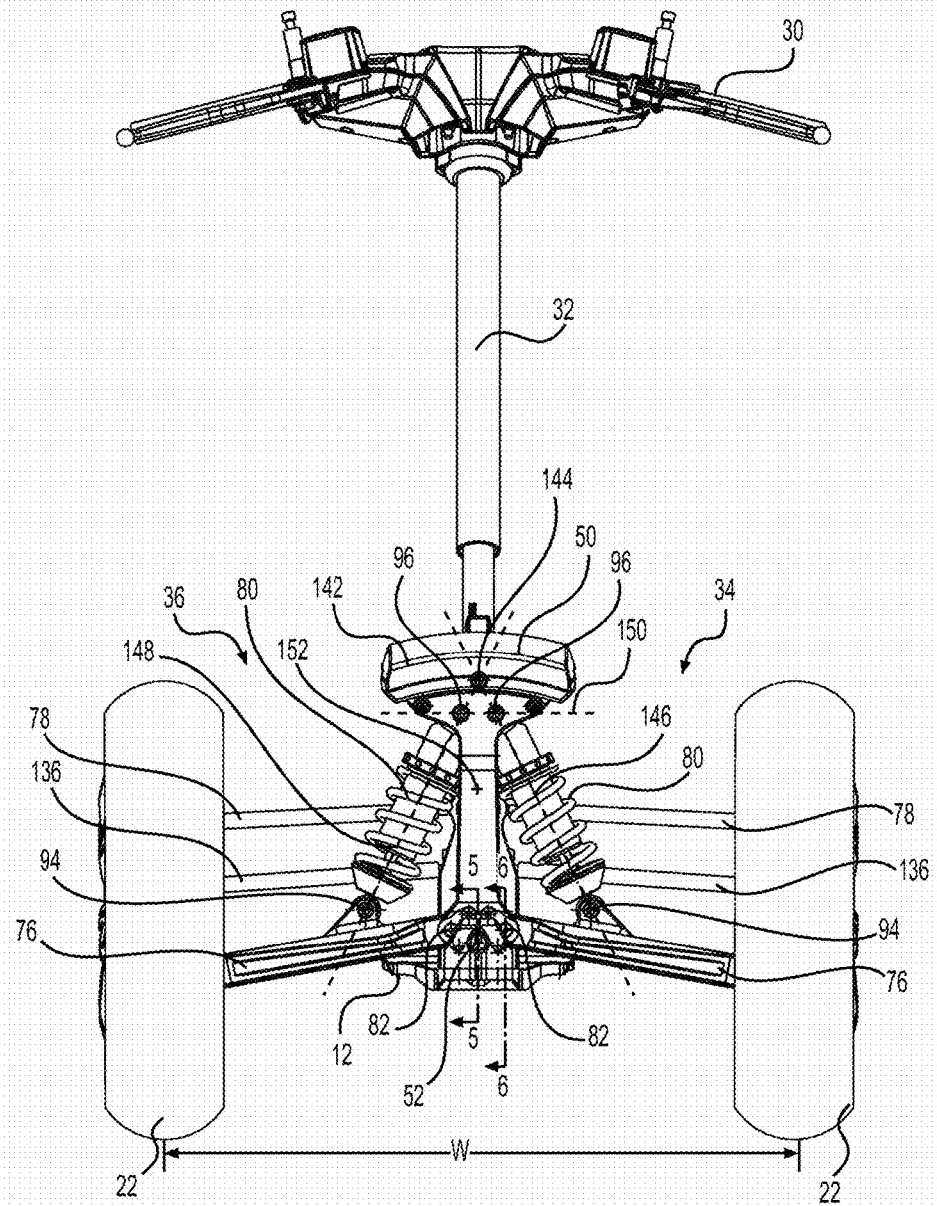
FIG. 4 is a front elevation view of front suspension assemblies, front wheels, a shock tower, a steering assembly and a portion of a frame of the vehicle of FIG. 3.

As can be seen in FIG. 4, a shock tower 50 is pivotally connected to a front portion of the frame 12 to permit the frame 12 to pivot about a frame leaning axis 52. The front left and right suspension assemblies 34 and 36 are connected to the shock tower 50 and the frame 12 to permit the frame 12 and the single central rear wheel 26 to lean towards the right side or the left side in a turn much like a motorcycle when the vehicle 10 is in operation. Additionally, the front wheels 22 are connected to the left and right suspension assemblies 34 and 36 in such a way that the front wheels 22 also tilt when the frame 12 is leaning into a corner.

Figure 5:
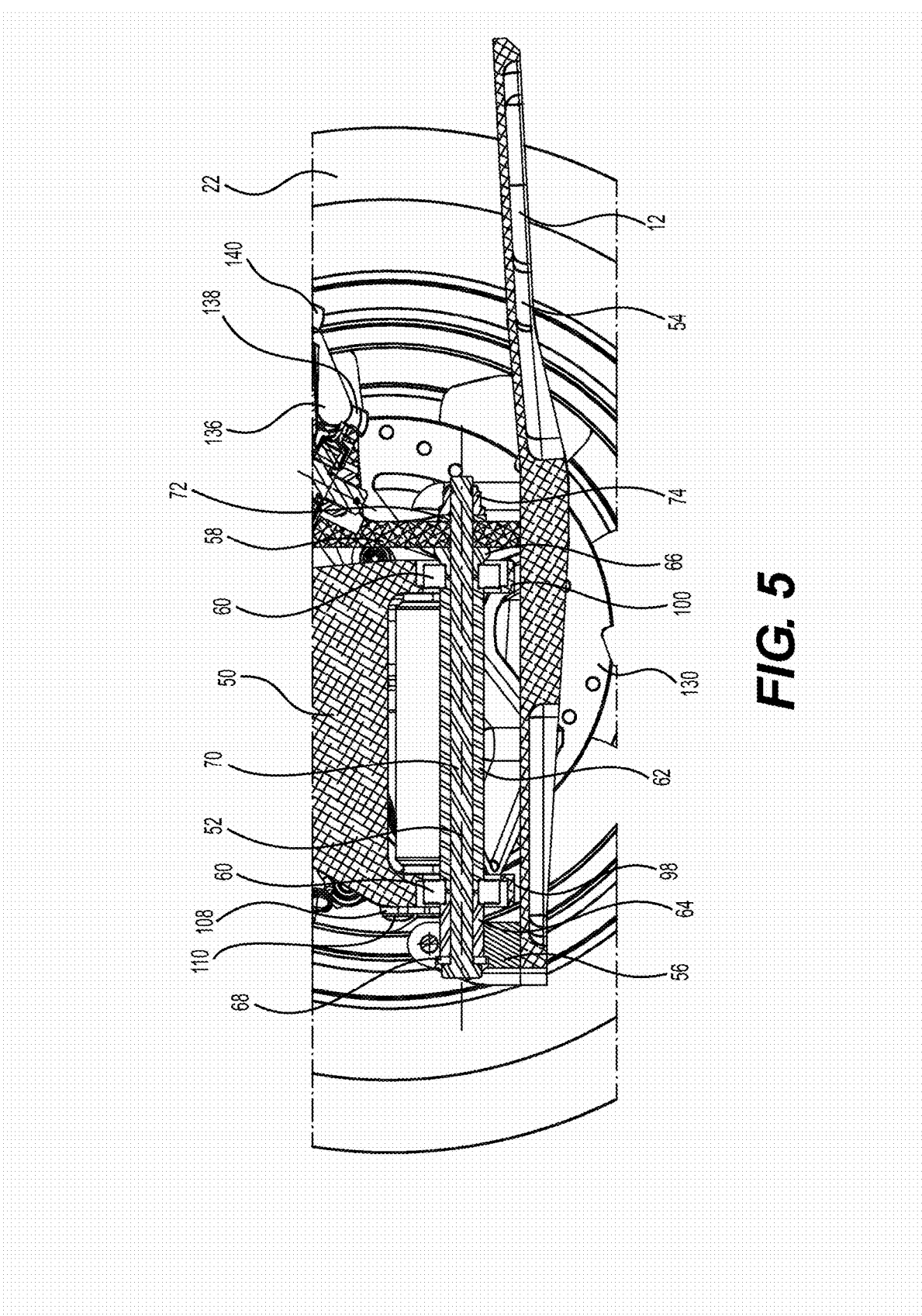
FIG. 5 is a cross-sectional view of the components of FIG. 4 taken through line 5-5 of FIG. 4.

As can be seen in FIG. 5, the frame 12 has a front plate 54. A front tab 56 extends from the front of the front plate 54 and a frame member 58 extends from the front plate 54 rearward of the front tab 56. The lower end of the shock tower 50 is received between the front tab 56 and the frame member 58. The shock tower 50, the front tab 56 and the frame member 58 have apertures (not labeled) that are coaxial with the frame leaning axis 52. Two bearings 60 are received in recesses formed at the front and rear of the lower end of the shock tower 50. A sleeve 62 extends between the two bearings 60. A sleeve 64 extends from the front bearing 60 and through a portion of the aperture in the front tab 56. A sleeve 66 extends from the rear bearing 60 to the frame member 58. A washer 68 is disposed on the front of the front tab 56 in alignment with the aperture through the front tab 56. A bolt 70 is inserted through the washer 68, the sleeves 62, 64, 66 and the frame member 58. A washer 72 is disposed around the end of the bolt 70 that extends rearward of the frame member 58. A nut 74 is fastened to the end of the bolt 70 that extends rearward of the frame member 58. As a result, the shock tower 50 is pivotally connected to the frame 12 about the frame leaning axis 52 and although it bears all the suspended mass of the front of the vehicle 10, creates very little friction against the leaning motion to preserve the natural free-leaning feel. It is contemplated that the shock tower 50 could be pivotally connected to the frame 12 in manners that are different from the one described above.

With reference to FIGS. 4 and 6 to 13, the front left suspension assembly 34 will be described in detail. The front right suspension assembly 36 is a mirror image of the front left suspension assembly 34 and as such will not be described in detail below. Components of the front right suspension assembly 36 corresponding to those of the front left suspension assembly 34 have been labelled with the same reference numbers in the figures.

Figure 13:
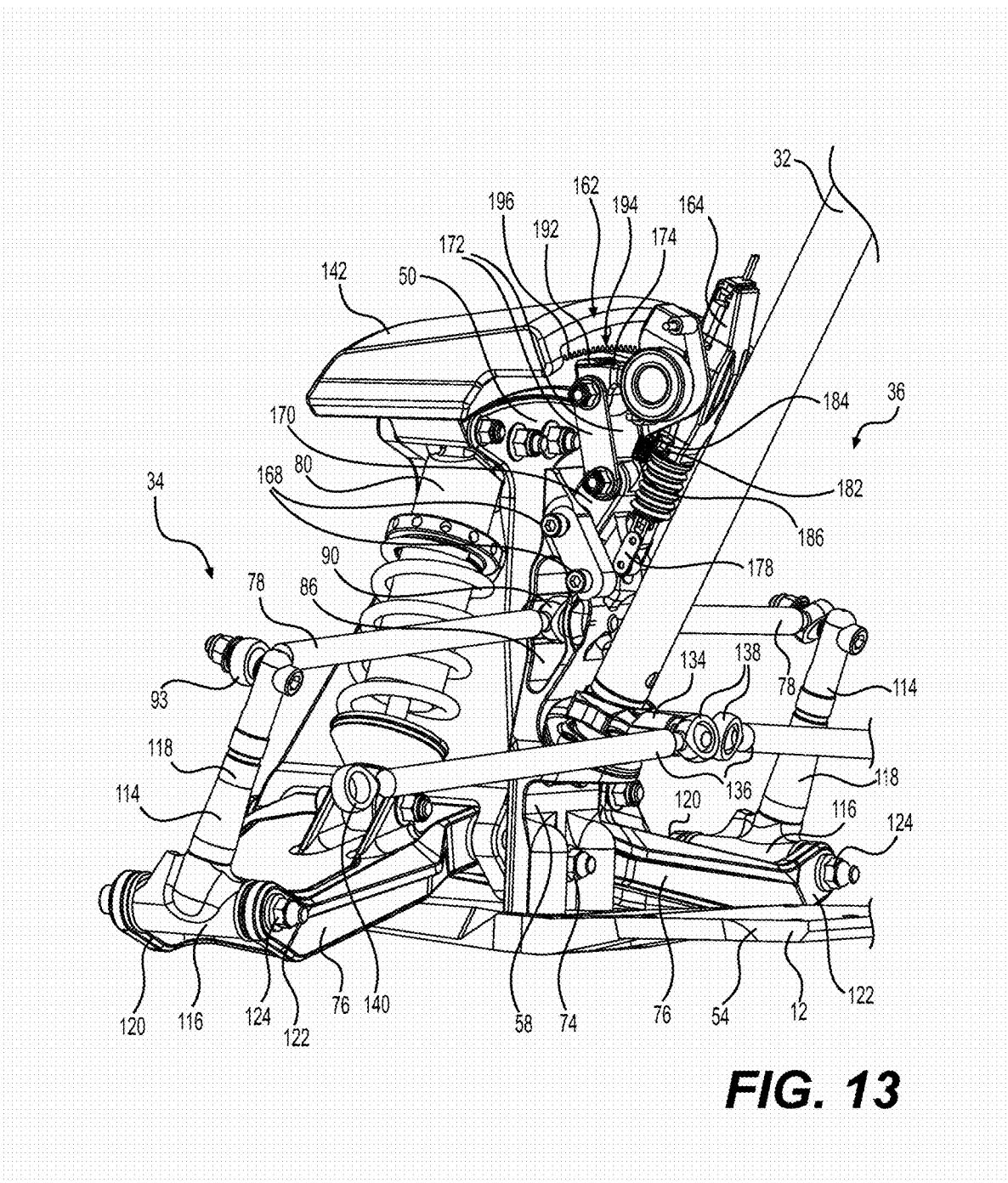
FIG. 13 is a close-up, perspective view taken from a rear, left side of the components of FIG. 4 with the front wheels removed and showing a lock in an unlocked position.

The front left suspension assembly 34 includes a lower left suspension arm 76, an upper left suspension arm 78 and a left shock absorber 80. The right end of the lower left suspension arm 76 is pivotally connected about a lower left pivoting axis 82 to the lower end to the shock tower 50 as will be described in greater detail below. When the frame 12 is in the upright position, the lower left pivoting axis 82 is disposed vertically higher than and to the left of the frame leaning axis 52. The left end of the lower left suspension arm 76 is pivotally connected about the lower left tilting axis 40 to the lower end of a kingpin assembly 84 as will be described in greater detail below. As best seen in FIG. 13, the right end of the upper left suspension arm 76 is received in an aperture 86 in the frame member 58 and pivotally connected about an upper left pivoting axis 88 (FIGS. 7 and 14) to the frame member 58 by a ball joint 90. The left end of the upper left suspension arm 76 is pivotally connected about an upper left tilting axis 92 to the upper end of the kingpin assembly 84 by a ball joint 93. The lower end of the left shock absorber 80 is pivotally connected about a lower left shock absorber axis 94 to the lower left suspension arm 76. The lower left shock absorber axis 94 is disposed laterally between the lower left pivoting axis 82 and the lower left tilting axis 40. The upper end of the left shock absorber 80 is pivotally connected about an upper left shock absorber axis 96 to the upper end of the shock tower 50. The upper left shock absorber axis 96 is disposed to the left of the frame leaning axis 52.

Figure 6:
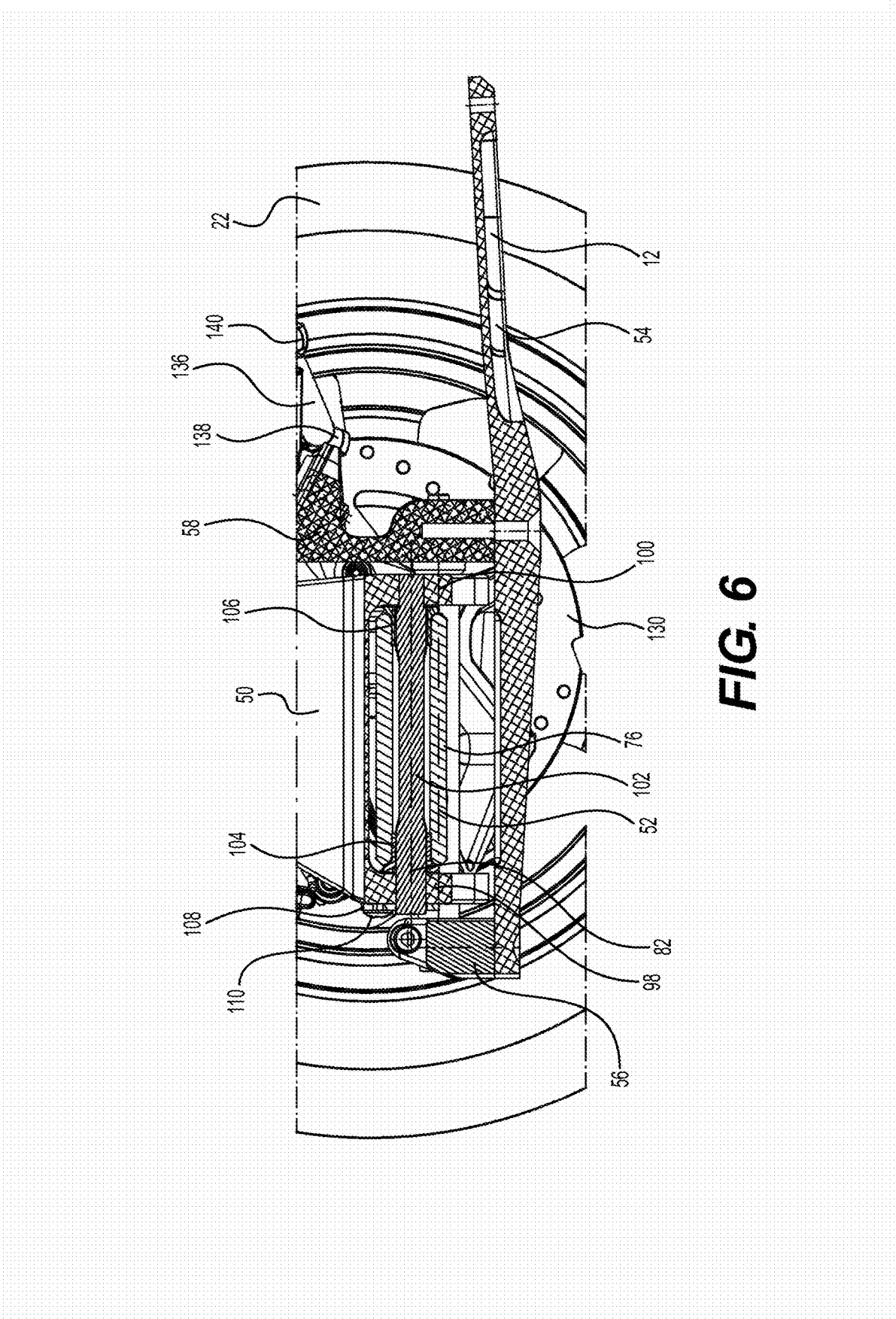
FIG. 6 is a cross-sectional view of the components of FIG. 4 taken through line 6-6 of FIG. 4.

As can be seen in FIG. 6, the right end of the lower left suspension arm 76 is received between front and rear legs 98, 100 defined by the lower end of the shock tower 50. A pin 102 is inserted through apertures (not labeled) defined by the front and rear legs 98, 100 and the right end of the lower left suspension arm 76. These apertures and the pin 102 are coaxial with the lower left pivoting axis 82. Front and rear bushings 104, 106 are disposed between the pin 102 and the lower left suspension arm 76 to permit pivoting of the lower left suspension arm 76 about the lower left pivoting axis 82. The front end of the pin 102 extends through and is welded to a tab 108. The tab 108 is fastened to the front of the leg 98 of the shock tower 50 by a threaded fastener 110 that is offset from the lower left pivoting axis 82. It is contemplated that the lower left pivoting axis 76 could be pivotally connected to the shock tower 50 in manners that are different from the one described above.

The kingpin assembly 84 includes a knuckle 112 (FIG. 9) and a kingpin 114 (FIG. 13). The kingpin 114 has an inverted T-shape. As can be seen in FIG. 13, the kingpin 114 has a lower, generally horizontally extending shaft 116 and a shaft 118 that extends upward and rearward from the shaft 116. The knuckle 112 is disposed around the shaft 118 of the kingpin 114 such that the knuckle 112 can rotate around the shaft 118 to steer the wheel 22. As such, the shaft 118 defines the steering axis 38. The shaft 116 is received between front and rear arms 120, 122 (FIG. 13) defined by the left end of the lower suspension arm 76. A fastener 124 pivotally fastens the shaft 116 to the arms 120, 122 about the lower tilting axis 40. The ball joint 93 at the right end of the upper suspension arm 78 is pivotally connected to the upper end of the shaft 118.

Turning now to FIGS. 7, 9, 10 and 13, the steering assembly, the connection of the steering assembly to the front left wheel 22, the connection of the front left wheel 22 to the left kingpin assembly 84 and the braking system of the front left wheel 22 will be described. The connection of the steering assembly to the front right wheel 22, the connection of the front right wheel 22 to the right kingpin assembly 84 and the braking system of the front right wheel 22 are mirror images of the corresponding elements on the left side of the vehicle 10 and will therefore not be described in detail herein. The corresponding components on each side of the vehicle 10 of the front wheels 22, the front braking systems and the steering assembly have been labeled with the same reference numbers in the figures.

Figure 10:
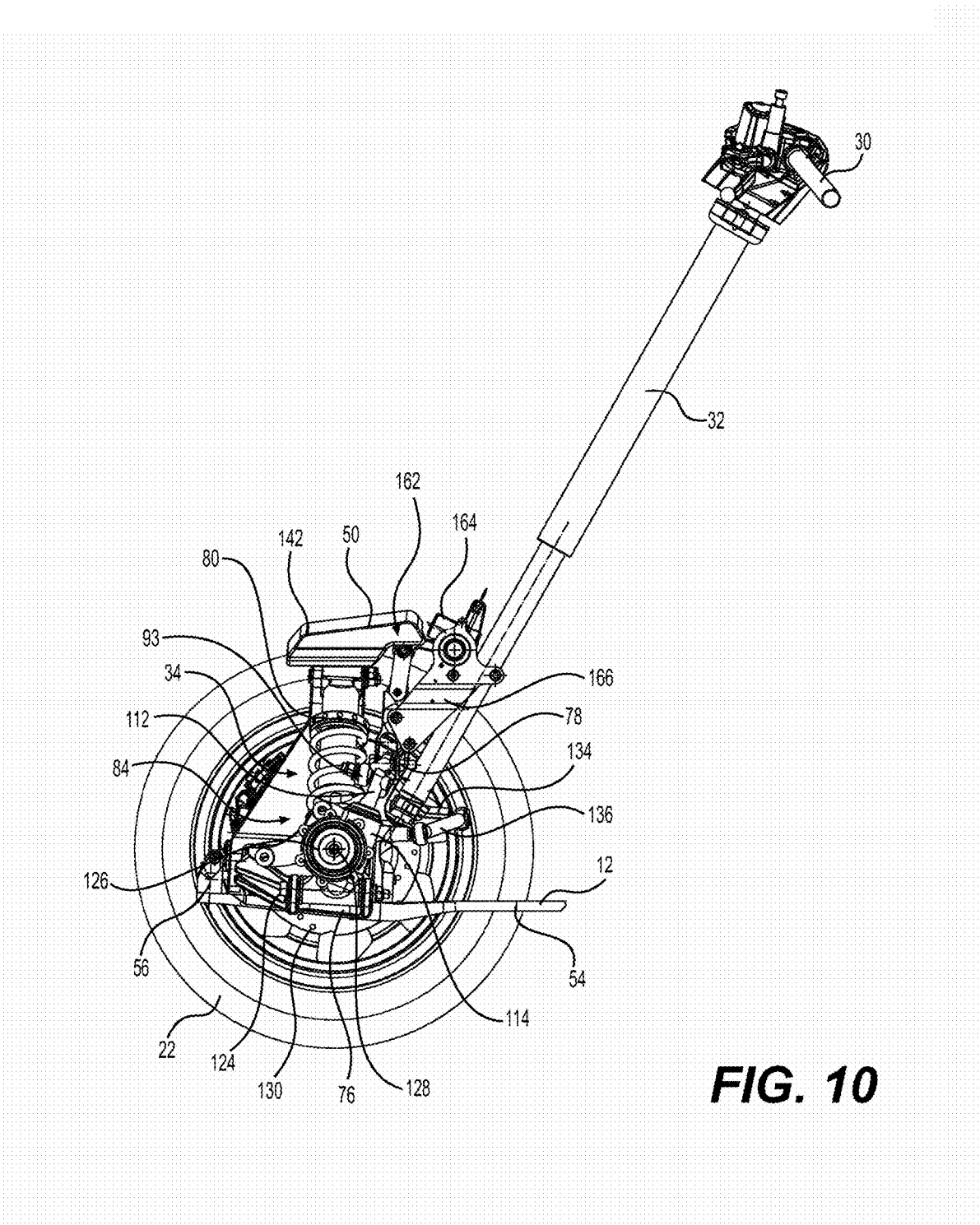
FIG. 10 is a left side elevation view of the components of FIG. 4 with the front left wheel removed.

A rotatable hub 126 is attached to the left side of the left knuckle 112. The front left wheel 22 is bolted to the hub 126 such that the front wheel 12 rotates about rotation axis 128 (FIG. 10). A brake disk 130 (shown only on the right side) is mounted on the hub 126. A brake caliper 132 (shown only on the right side in FIG. 9) is connected to the front of the knuckle 112 and is disposed over a portion of the brake disk 130 to brake the front wheel 22.

As can be seen in FIG. 13, a lower end of the steering column 32 is received in and is pivotally connected to the frame member 58. A pitman arm 134 is connected to and extends rearward from the lower end of the steering column 32. A right end of a left steering rod 136 is connected via a ball joint 138 to the pitman arm 134. A left end of the left steering rod 136 is connected via a ball joint 140 to a rear of the left knuckle 112. By turning the steering column 32, the left steering rod 136 is pushed or pulled, which turns the knuckle 112 about the shaft 118 of the kingpin 114, which steers the front left wheel 22 about the steering axis 38.

Figure 11:
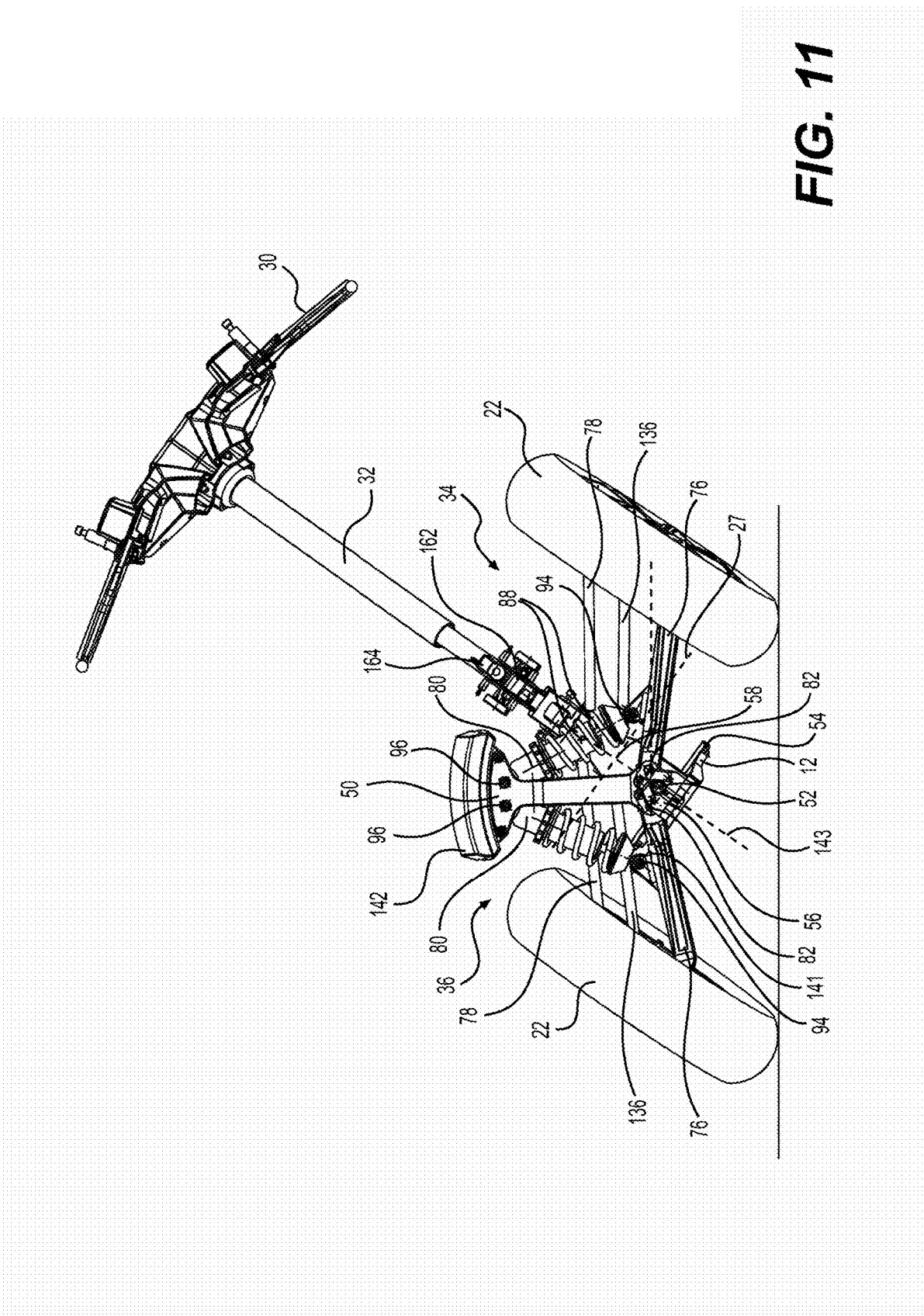
FIG. 11 is a front elevation view of the components of FIG. 4 with the frame leaning toward a left.

In order to steer the vehicle 10 and lean the frame 12 in the direction of the turn, the driver of the vehicle 10 has to steer by what is known as counter-steering. To counter-steer, the driver applies a torque (i.e. turns) the handlebar 30 and steering column 32 in a direction opposite to the direction of the turn, this applies a counter-torque (or reaction torque) to the frame which causes the frame 12, and as a result the wheels 22, 26, to lean in the direction of the turn which steers the vehicle into the turn. Counter-steering of the vehicle 10 to make a left turn will be described in more detail with reference to FIG. 11. Although only the plate 54, the front tab 56, and the frame member 58 of the frame 12 are shown in FIG. 11, it should be understood that the other components of the frame 12 lean with these elements and that the steering column 12 leans with the frame 12. As such, the position of the steering column 32 can be used in the figures as an indicator of the position of the frame 12. To make a left turn, the driver applies a torque to the handlebar 30 and steering column 32 as if to steer the front wheels toward the right. As a result, the frame 12, the rear wheel 26, the steering column 32 and the other components connected to the frame 12 pivot toward the left about the frame leaning axis 52 with respect to the shock tower 50, while the shock tower 50 remains vertical.

As the wheels 22 receive the torque applied to the handlebar 30 they start to lean in the direction opposite the applied torque. Their leaning pushes or pulls, as the case may be, on the suspension arms 76 and 78 causing the frame to lean. As the wheels 22 pivot toward the left (i.e. clockwise with reference to FIG. 11), the upper left suspension arm 78 pulls the frame 12 toward the left, the upper right suspension arm 78 pushes on the frame 12 toward the left, the lower left suspension arm 76 pushes on the frame 12 toward the right and the lower right suspension arm 76 pulls on the frame toward the right. As a result, the frame 12 leans toward the left (i.e. clockwise with reference to FIG. 11) and the vehicle 10 turns left. As can be seen in FIG. 11, when the vehicle 10 is leaning into a corner, the shock tower 50 remains upright while the frame 12 is pivoting about the leaning axis 52. As such, the front left and right suspension assemblies 34, 36 are not involved in the leaning motion of the frame 12. As can be seen by comparing FIG. 4 which has the frame 12 in an upright position with FIG. 11 which has the frame 12 leaning toward the left, the operation of the front left and right suspension assemblies 34, 36 is independent of the leaning motion of the frame 12. As can also be seen by comparing FIG. 4 to FIG. 11, the positions of the left and right pivoting axes 82 relative to the frame leaning axis 52 do not change when the frame 12 pivots about the frame leaning axis 52. A line 141 (FIG. 11) passing through the left and right pivoting axes 82 remains horizontal regardless of a position of the frame 12 relative to the shock tower 50. As a result, with all other things being equal, for the same turn radius, taken at the same speed, in order to balance the centrifugal forces, the frame 12 of the vehicle 10 does not need to pivot about the frame leaning axis 52 as much as the frame would have to pivot in a vehicle having the lower suspension arms pivotally connected to the frame (as in the '456 publication for example).

Figure 12:
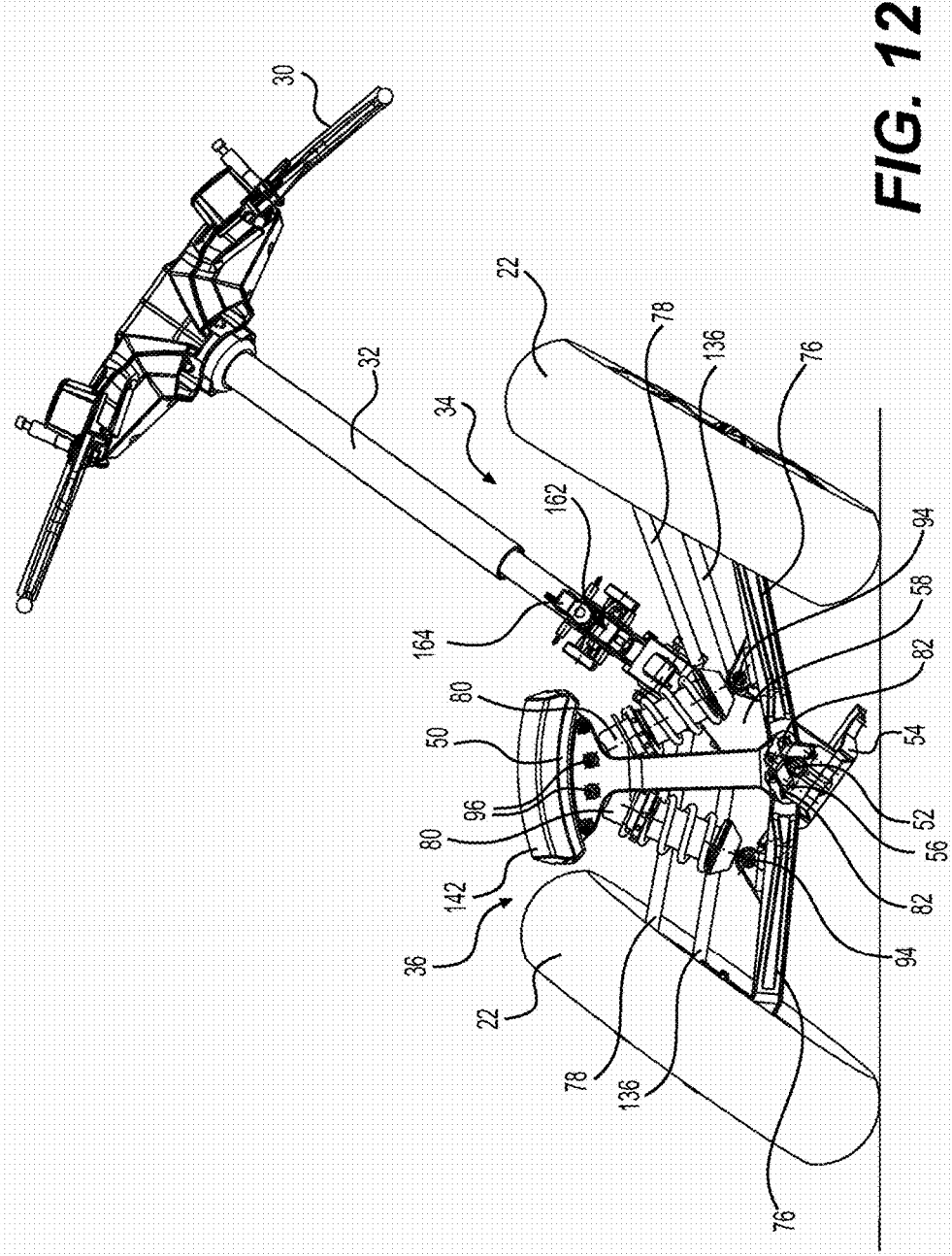
FIG. 12 is a front elevation view of the components of FIG. 4 with the frame leaning toward the left with the front suspension assemblies in compression.

As can also be seen by comparing FIG. 4 to FIG. 8 and FIG. 11 to FIG. 12, the position of the left and right pivoting axes 82 relative to the frame leaning axis 52 also does not change when the shock absorbers 80 are compressed whether the frame 12 is upright (FIGS. 4 and 8) or leaning (FIGS. 11 and 12). The same is true when the shock absorbers 80 are in expansion. As can be seen in FIG. 11, a plane (corresponding to line 27 in FIG. 11) defined by the axis of rotation 27 of the rear wheel 26, which is parallel to a plane (corresponding to line 141 in FIG. 141) containing to the pivoting axes 82 when the frame 12 is in an upright position, intersects the plane corresponding to line 141 when the frame 12 is pivoted to one of the right side and the left side relative to the shock tower 50. Similarly, as can be seen in FIG. 11, a plane 143 containing the frame leaning axis 52 and passing through a center of the steering column 32 is disposed at an acute angle to the plane (corresponding to line 141) containing the left and right pivoting axes 82 when the frame 12 is pivoted to one of the right side and the left side relative to the shock tower 50.

In order to reduce wheel hop, the shock tower 50 has cap 142 that is fastened to the remaining portion of the shock tower 50 so as to be disposed at the top of the shock tower 50. The mass of the cap 142 is selected such that, as can be seen in FIG. 4, the center of gravity 144 of the shock tower 50 is located at a position where a line parallel to the frame leaning axis 52 (in FIG. 4, this line corresponds to the center of gravity 144) passes through an intersection point of a line 146 passing through the upper left shock absorber axis 96 and the lower left shock absorber axis 94 and of a line 148 passing through the upper right shock absorber axis 96 and the lower right shock absorber axis 94. The lines 146 and 148 are disposed in a common plane (i.e. the plane defined by the page containing FIG. 4 in the present example). It is contemplated that the mass of the cap 142 could alternatively be selected such that the center of gravity 144 of the shock tower 50 is disposed at a location between a line 150 passing through the upper left and right shock absorber axes 96 and the top of the shock tower 50. It is also contemplated that the mass of the cap 142 could alternatively be selected such that the center of gravity 144 of the shock tower 50 is disposed at a location between the top of the shock tower 50 and a point 152 that is disposed halfway between the frame leaning axis 52 and the top of the shock tower 50. It is also contemplated that the mass of the cap 142 could alternatively be selected such that the center of gravity 144 of the shock tower 50 is disposed a distance above the frame leaning axis 52 that is at least a quarter of the front track width W (FIG. 4). The front track width is the distance measured laterally between the central contact points of the tires of the front wheels 22 with the ground when the front wheels 22 and the frame 12 are upright as in FIG. 4.

The added mass of the cap 142 and the resulting position of the center of gravity of the shock tower 50 ensure that the moment of inertia of the shock tower 50 about the frame leaning axis 52 is sufficiently high to at least partially resist the forces generated by both high amplitude and low amplitude/high frequency movements of the front wheels 22. In the case of low amplitude/high frequency movements of the front wheels 22, the moment of inertia of the shock tower 50 about the frame leaning axis 52 is sufficiently high to cause the tires of the front wheels 22 to absorb the forces generated by the movements of the front wheels 22 and/or for the stiffness of the shock absorbers 80 to be overcome by these forces. As such, these forces do not oscillate between the two front suspension assemblies 34, 36 via the shock tower 50 as much as they would in a vehicle similar to the one described in the '456 publication for example. In the cases where the forces do oscillate between the two front suspension assemblies 34, 36 via the shock tower 50, the higher moment of inertia of the shock tower 50 causes some of the forces to be absorbed by the tires of the front wheels 22 and/or the shock absorbers 80 at each cycle of the oscillation of the forces, thus reducing the wheel hop effect compared to a vehicle similar to the '456 publication for example. In one implementation, the moment of inertia of the shock tower 50 is at least twenty-five percent of the combined moment of inertia of the unsprung masses associated with the front left and right suspension assemblies 34, 36. The unsprung mass associated with the front left suspension assembly 34 is the combined mass of all of the components on the front, left side of the vehicle 10 that are suspended from the shock tower 50 by the left shock absorber 80. These components include, but are not limited to, the lower left suspension arm 76, the upper left suspension arm 78, the left steering rod 136, the left kingpin assembly 84, the left hub 126, the left brake disk 130, the left brake caliper 132 and the front left wheel 22. The unsprung mass associated with the front right 34 is the combined mass of all of the components on the front, right side of the vehicle 10 that are suspended from the shock tower 50 by the right shock absorber 80. These components include, but are not limited to, the lower right suspension arm 76, the upper right suspension arm 78, the right steering rod 136, the right kingpin assembly 84, the right hub 126, the right brake disk 130, the right brake caliper 132 and the front right wheel 22.

It is contemplated that the cap 142 could be integrally formed or permanently connected to the rest of the shock tower 50. However, having a separate cap 142 that is fastened to the rest of the shock tower 50 facilitates tuning of the moment of inertia of the shock tower 50 to obtain the desired level of wheel hop reduction. Having a separate cap 142 that is fastened to the rest of the shock tower 50 also facilitates adjustment of the moment of inertia of the shock tower 50 should one or more of the components forming part of the unsprung mass be replaced with components having a different mass, or should the shock absorbers 80 and/or the tires for the front wheels 22 be replaced with shock absorbers and tires having different shock absorption characteristics. It is contemplated that the manner of obtaining a certain moment of inertia for the shock tower 50 could also be used in other leaning vehicles, such as in leaning vehicles having a shock tower where the lower suspension arms are connected to the frame for example as in the '456 publication instead of being connected to the shock tower 50 as in the present application.

FIG. 17 illustrates a shock tower 50' that is an alternative implementation of the shock tower 50. In the shock tower 50' instead of increasing the moment of inertia of the shock tower 50' by adding a cap 142 as in the shock tower 50 described above, the moment of inertia of the shock tower 50' is increased by adding weights 154 that are laterally spaced from the frame leaning axis 52. The shock tower 50' has two arms 156 extending laterally outwardly from the center member 158. Each arm 156 has two tabs 160. The weights 154 are inserted around the arms 156 between the tabs 160. The mass of the weights 154 and the distance from the frame leaning axis 52 where the weights 154 are disposed are selected such that the moment of inertia of the shock tower 50' is at least twenty-five percent of the combined moment of inertia of the unsprung masses associated with the front left and right suspension assemblies 34, 36. It is contemplated that the shock tower 50' could additionally be provided with a cap 142.

Turning now to FIGS. 10 and 13 to 16, a lock 162 and actuator 164 of the vehicle 10 that are used to selectively prevent relative movement between the frame 12 and the shock tower 50 will be described. Although the lock 162 and actuator 164 are being described with respect to the vehicle 10 described above, it is contemplated that the lock 162 and actuator 164 could also be used in other leaning vehicles, such as in a leaning vehicle having a shock tower and lower suspension arms connected to the frame similar to the vehicle described in the '456 publication for example.

Figure 14:
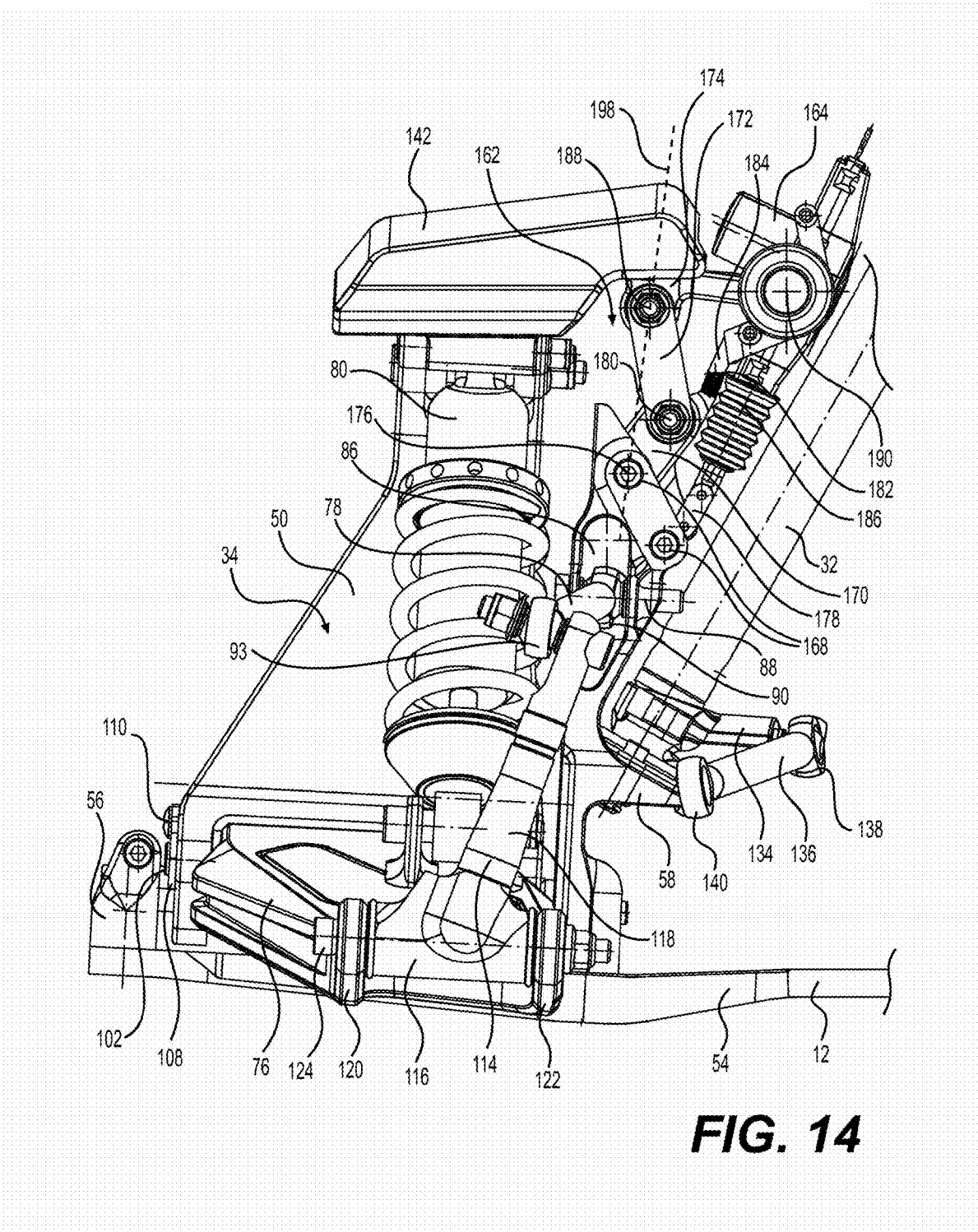
FIG. 14 is a close-up, left side elevation view of the components of FIG. 4 with the front wheels removed and showing the lock in the unlocked position.
Figure 15:
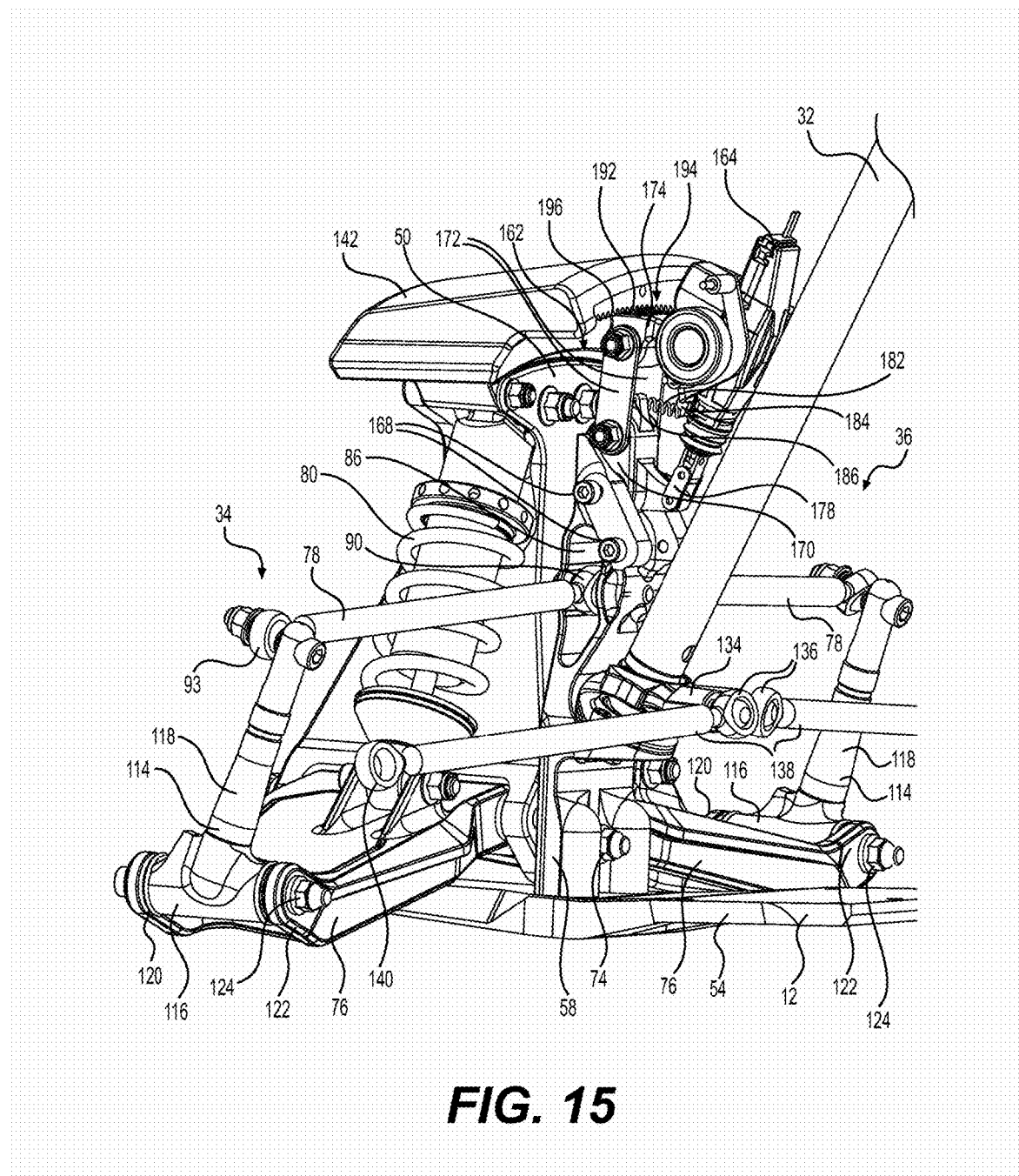
FIG. 15 is a close-up, perspective view taken from a rear, left side of the components of FIG. 4 with the front wheels removed and showing the lock in a locked position.
Figure 16:
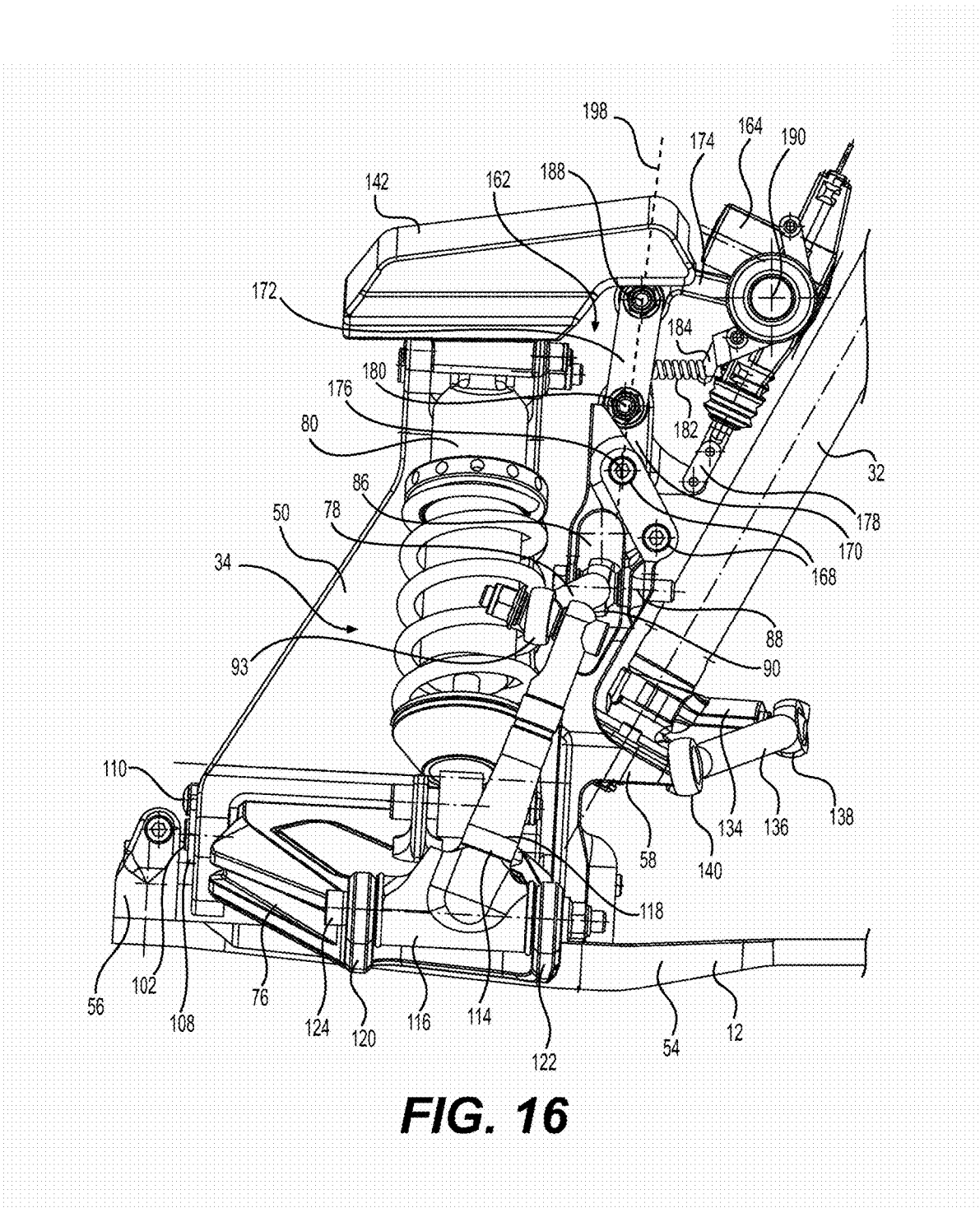
FIG. 16 is a close-up, left side elevation view of the components of FIG. 4 with the front wheels removed and showing the lock in the locked position.

The lock 162 is movable between an unlocked position shown in FIGS. 13 and 14 and a locked position shown in FIGS. 15 and 16. When the lock 162 is in the unlocked position, the frame 12 can lean about the frame leaning axis 52 relative to the shock tower 50 as described above. When the lock 162 is in the unlocked position, the vehicle 10 is steered by counter-steering as described above. When the lock 162 is in the locked position, the lock 162 engages the shock tower 162 as will be described below and prevents the frame 12 from leaning about the frame leaning axis 52 relative to the shock tower 50. When the lock 162 is in the locked position, the vehicle 10 is steered by turning the handlebar 30, and therefore the front wheels 22, in the direction of the turn, in a manner similar to the manner in which steering is achieved in a vehicle that does not have a frame that can lean such as a four-wheel all-terrain vehicle.

An actuator 164 is connected between the frame 12 and the lock 162 to move the lock 162 between its locked and unlocked positions. The actuator 164 is actuated by the driver of the vehicle via an input device (not shown), such as button or a switch, located on or near the handlebar 30. It is contemplated that a frame position sensor could be provided between the frame 12 and the shock tower 50. This sensor could be used to prevent the actuator 164 from moving the lock 162 to the locked position when the frame 12 is leaning at an angle where the lock 162 would not engage the shock tower 50 (see FIG. 11 for example) as this would prevent the frame 12 from returning to the upright position (i.e. the lock 162 would hit the side of the shock tower 50). Should the driver of the vehicle 10 actuate the input device to indicate that the locked position of the lock 162 is desired, the sensor would prevent the actuator 164 from moving the lock 162 to the locked position until the frame 12 is at or near the upright position such that the lock 162 can engage the shock tower 50. It is also contemplated that the actuator 164 could be connected to a control unit which would automatically control the actuator 162 to move the lock 162 between its locked and unlocked positions based on one or more operating conditions of the vehicle 10.

For example, the control unit could cause the actuator 164 to move the lock 162 to the locked position when the vehicle 10 is stopped or operating at low speeds and cause the actuator 164 to move the lock 162 to the unlocked position when the vehicle 10 is operating at medium and high speeds.

The actuator 164 is mounted between two plates 166 (FIG. 10) in front of the steering column 32. The plates 166 are connected to the top of the frame member 58 on either side thereof by fasteners 168. In the present implementation, the actuator 164 includes an electric motor coupled to a rack and pinion assembly to form a linear actuator. It is contemplated that other types of actuators such as a solenoid, a hydraulic or pneumatic piston, or a rotary actuator could be used.

The lock 162 includes an overcenter mechanism formed by an L-shaped link 170, a pair of links 172, a toothed link 174 and a spring 182. Although they have not been labeled, the links 170, 172, 174 are connected to each other and to the frame member 58 via nuts and bolts surrounded by bushings permitting the rotation of the links 170, 172, 174 relative to each other and to the frame member 58. The L-shaped link 170 is pivotally connected at to the frame member 58 about a laterally extending axis 176. The end of a leg of the L-shaped member 170 is pivotally connected to the end of the actuator 164 by a linkage 178. The upper portion of the L-shaped link 170 is disposed between the lower ends of the links 172 and is pivotally connected to the lower end of the links 172 about a laterally extending axis 180. The spring 182 is connected between a fixed member 184 connected to the actuator 164 and an upper end of the L-shaped link 170 at a point 186. The axis 180 is disposed between the axis 176 and the point 186. The upper ends of the links 172 are disposed on either side of the front of the toothed link 174 and are pivotally connected to the front of the toothed link 174 about a laterally extending axis 188. The rear end of the toothed link 174 is pivotally connected to the plates 166 about a laterally extending axis 190. It is contemplated that instead of being connected to the link 170, the actuator 164 and the spring 182 could be connected to one or both of the links 172. It is also contemplated that the actuator 164 could be connected to one of the links 170 and 172 and that the spring 182 could be connected to the other one of the links 170, 172.

The toothed link 174, as its name suggests, has a number of teeth 192. The teeth 192 are defined by the upwardly facing upper curved surface of the toothed link 174. As it is the upper curved surface of the toothed link 174 that engages the shock tower 50 to lock the frame 12 relative to the shock tower 50, as will be described in greater detail below, this surface is referred to as the shock tower engagement surface. In the present implementation, the shock tower engagement surface defines four teeth 192, but it is contemplated that it could define more or less than four teeth 192.

The cap 142 of the shock tower 50 has a downwardly facing curved toothed surface 194 defining a number of teeth 196. As it is this surface that engages the shock tower engagement surface of the lock 162 when the lock 162 is in the locked position, this surface is referred to as the lock engagement surface. In the present implementation, the center of curvature of the surface 194 corresponds to the frame leaning axis 52. As will be described below, in the unlocked position, the lock engagement surface of the shock tower 50 and the shock tower engagement surface of the lock 162 are spaced from each other. When the lock 162 is moved to its locked position, the toothed link 174 moves up such that the teeth 192 of the lock 162 engage some of the teeth 196 of the shock tower 50 and, as a result, the lock engagement surface of the shock tower 50 and the shock tower engagement surface of the lock 162 come in contact with each other. It is contemplated that the teeth 192 and 196 could be replaced by pins and corresponding apertures. It is also contemplated that the teeth 192 and 196 could be omitted such that the locking of the frame 12 with the shock tower 50 is achieved by friction between the lock engagement surface of the shock tower 50 and the shock tower engagement surface of the lock 162. To improve the friction in such an implementation, it is contemplated that the lock engagement surface of the shock tower 50 and the shock tower engagement surface of the lock 162 could be abrasive or rubberized surfaces.

The operation of the lock 162 will now be described. As can be seen in FIG. 14, when the lock 162 is in the unlocked position, the links 170 and 172 are positioned such that the axis 180 is disposed behind a line 198 passing through the axes 176 and 188. Also, when the lock 162 is in the unlocked position, the top surface of the link 174 is spaced from the surface 194 of the shock tower 50. Also, when the lock 162 is in the unlocked position, the spring 182 pushes down on the link 170 at point 186, thereby biasing the lock 162 toward the unlocked position. By having the spring 182 bias the lock 162 toward the unlocked position, power does not need to be applied to the actuator 164 to maintain the lock 162 in the unlocked position.

To move the lock 162 from the unlocked position (FIGS. 13 and 14) to the locked position (FIGS. 15 and 16), the actuator 164 is activated to pull via the linkage 178 on the link 170. With reference to the orientation shown in FIGS. 14 and 16 (i.e. as seen from a left side of the vehicle 10), this causes the link 170 to rotates counter-clockwise about the axis 176, the links 172 to rotate clockwise about the axis 188, and the link 174 to rotate clockwise about the axis 190 until the front portion of the link 170 comes in contact with the upper end of the frame member 58.

As can be seen in FIG. 16, when the lock 162 is in the locked position, the links 170 and 172 are positioned such that the axis 180 is disposed in front of the line 198. Also, as can be seen by comparing the position of the link 174 in FIG. 14 to the position of the link 174 in FIG. 16, it can be seen that the front portion of the link 174 has moved up. As a result, when the lock 162 is in the locked position, the top surface of the link 174 contacts the surface 194 of the shock tower 50 and the teeth 192 of the link 174 engage the teeth 196 of the shock tower 50, thereby preventing the frame 12 from pivoting about the frame leaning axis 52 relative to the shock tower 50. Also, when the lock 162 is in the locked position, the spring 182 pushes forward on the link 170 at point 186, thereby biasing the lock 162 toward the locked position. By having the spring 182 bias the lock 162 toward the locked position, power does not need to be applied to the actuator 164 to maintain the lock 162 in the locked position. The frame member 58 acts as a stopper to limit the counter-clockwise rotation of the link 170 from the unlocked position to the locked position since further counter-clockwise rotation of the link 170 would cause the link 174 to start rotating counter-clockwise about the axis 190, which would cause the front portion of the link 174 to move away from the surface 194, thereby disengaging the teeth 192 from the teeth 196.

To move the lock 162 from the locked position to the unlocked position, the actuator 164 is activated to push via the linkage 178 on the link 170. As a result, the links 170, 172 and 174 rotate in directions opposite to the ones described above to move the lock 162 from the unlocked position to the locked position until they reach the positions shown in FIGS. 13 and 14.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A leaning vehicle comprising:
    a frame having a front portion and a rear portion;
    a shock tower having an upper end and a lower end, the lower end of the shock tower being pivotally connected to the frame about a frame leaning axis about which the frame can pivot to a right side and to a left side relative to the shock tower;
    a front left ground engaging member and a front right ground engaging member connected to the shock tower via a front left suspension assembly and a front right suspension assembly respectively;
    a steering assembly having a rotatable steering column supported by the frame and being operatively connected to the front left ground engaging member and the front right ground engaging member;
    a rear suspension assembly connected to the rear portion of the frame;
    at least one rear ground engaging member connected to the rear suspension assembly; and
    a motor operatively connected to at least one of the ground engaging members;
    the front left suspension assembly including:
        a lower left suspension arm having a first end and a second end, the first end being pivotally connected about a left pivoting axis to the lower end of the shock tower and the second end being pivotally connected about a left tilting axis to the front left ground engaging member; and
        a left shock absorber having an upper end connected to the upper end of the shock tower and a lower end connected to the lower left suspension arm, the front right suspension assembly including:
        a lower right suspension arm having a first end and a second end, the first end being pivotally connected about a right pivoting axis to the lower end of the shock tower and the second end being pivotally connected about a right tilting axis to the front right ground engaging member; and
        a right shock absorber having an upper end connected to the upper end of the shock tower and a lower end connected to the lower right suspension arm, the frame being pivotable about the frame leaning axis relative to the left and right pivoting axes.

2. The leaning vehicle of claim 1, wherein the front left ground engaging member is a front left wheel, the front right ground engaging member is a front right wheel, and the at least one rear ground engaging member is at least one rear wheel.

3. The leaning vehicle of claim 2, wherein the at least one rear wheel is a single rear wheel.

4. The leaning vehicle of claim 1, wherein the left pivoting axis is a lower left pivoting axis, the left tilting axis is a lower left tilting axis, the right pivoting axis is a lower right pivoting axis, and the right tilting axis is an lower right tilting axis;
    wherein the front left suspension assembly further includes an upper left suspension arm having a first end and a second end, the first end being pivotally connected about an upper left pivoting axis to the frame and the second end being pivotally connected about an upper left tilting axis to the front left ground engaging member;
wherein the front right suspension assembly further includes an upper right suspension arm having a first end and a second end, the first end being pivotally connected about an upper right pivoting axis to the frame and the second end being pivotally connected about an upper right tilting axis to the front right ground engaging member; and
wherein the upper left and right pivoting axes are pivotable about the frame leaning axis with the frame.

5. The leaning vehicle of claim 1, further comprising a lock selectively preventing relative movement between the frame and the shock tower about the frame leaning axis.

6. The leaning vehicle of claim 1, wherein the left pivoting axis is disposed to a left of the frame leaning axis; and
wherein the right pivoting axis is disposed to a right of the frame leaning axis.

7. The leaning vehicle of claim 1, wherein the left and right pivoting axes are disposed closer to the upper end of the shock tower than the frame leaning axis.

8. The leaning vehicle of claim 1, wherein the first end of the lower left suspension arm and the first end of the lower right suspension arm are each pivotally connected to the shock tower by a pin; and
further comprising at least one bushing disposed between each pin and the first end of its corresponding lower suspension arm.

9. The leaning vehicle of claim 1, wherein the left and right pivoting axes are parallel to each other.

10. The leaning vehicle of claim 1, wherein the left and right pivoting axes are parallel to the frame leaning axis.

11. The leaning vehicle of claim 1, wherein a line passing through the left and right pivoting axes remains horizontal regardless of a position of the frame relative to the shock tower.

12. The leaning vehicle of claim 3, wherein an axis of rotation of the rear wheel defines a first plane, the first plane being parallel to a second plane containing the left and right pivoting axes when the frame is in an upright position, and the first plane intersects the second plane when the frame is pivoted to one of the right side and the left side relative to the shock tower.

13. The leaning vehicle of claim 1, wherein a first plane containing the frame leaning axis and passing through a center of the steering column is disposed at an acute angle to a second plane containing the left and right pivoting axes when the frame is pivoted to one of the right side and the left side relative to the shock tower.

* * * * *